(12) United States Patent
Fukawatase et al.

(10) Patent No.: US 8,210,566 B2
(45) Date of Patent: Jul. 3, 2012

(54) VEHICLE BETWEEN-SEAT AIRBAG APPARATUS

(75) Inventors: Osamu Fukawatase, Nishikamo-gun (JP); Takehisa Shamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/677,834

(22) PCT Filed: Oct. 29, 2008

(86) PCT No.: PCT/JP2008/069645
§ 371 (c)(1),
(2), (4) Date: Mar. 12, 2010

(87) PCT Pub. No.: WO2010/050015
PCT Pub. Date: May 6, 2010

(65) Prior Publication Data
US 2011/0278826 A1    Nov. 17, 2011

(51) Int. Cl.
*B60R 21/20* (2006.01)
(52) U.S. Cl. ............. 280/730.1; 280/728.3; 280/730.2
(58) Field of Classification Search .............. 280/730.2, 280/730.1, 728.3, 728.1
See application file for complete search history.

(56) References Cited

U.S. PATENT DOCUMENTS
| 2003/0168836 A1 | 9/2003 | Sato et al. |
| 2007/0170707 A1 | 7/2007 | Sato et al. |

FOREIGN PATENT DOCUMENTS
| JP | 4356246 A | 12/1992 |
| JP | H53055 U | 1/1993 |
| JP | 5208647 A | 8/1993 |
| JP | 2003335210 A | 11/2003 |
| JP | 2004217109 A | 8/2004 |
| JP | 2008126783 A | 6/2008 |
| JP | 2008155904 A | 7/2008 |

*Primary Examiner* — Eric Culbreth
(74) *Attorney, Agent, or Firm* — Gifford, Krass, Sprinkle, Anderson & Citkowski, P.C.

(57) ABSTRACT

A vehicle between-seat airbag apparatus is provided that is capable of properly deploying an airbag stowed at a vehicle rear end side of a center console. A vehicle far-side airbag apparatus (10) is provided with: a far-side airbag (20) that is stowed in a corner portion (16B) at a vehicle rear end side and upper end side of a center console (16) that is disposed between seats arranged in a vehicle lateral direction, the far-side airbag (20) receiving a gas supply and being inflated; and an airbag door (40) that causes the far-side airbag (20) that receives the gas supply and is inflated to deploy in the vehicle front direction and upward with respect to the corner portion (16B), by supporting the far-side airbag (20) from the vehicle rear direction.

14 Claims, 15 Drawing Sheets

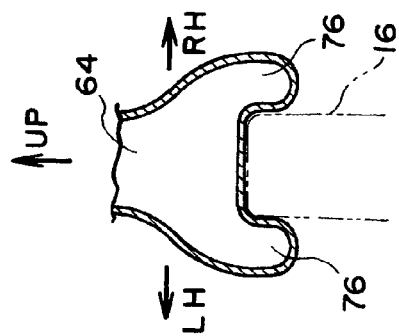
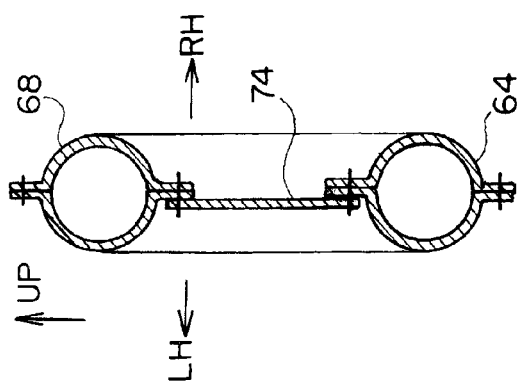
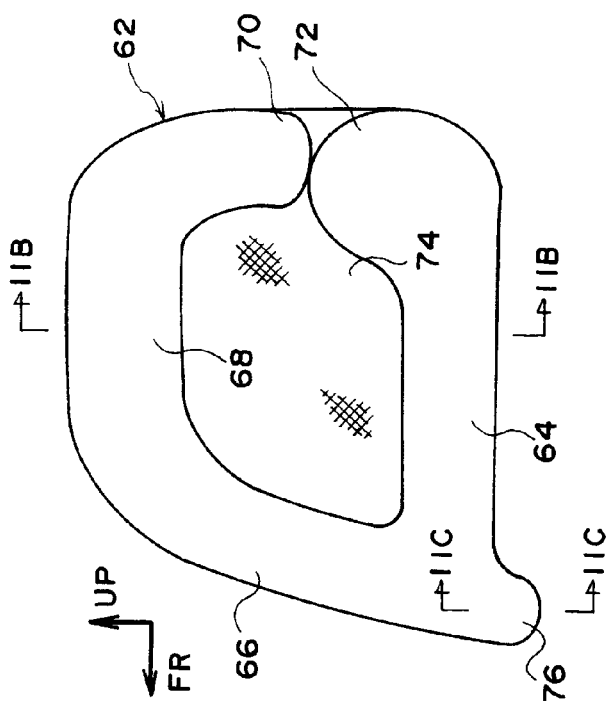

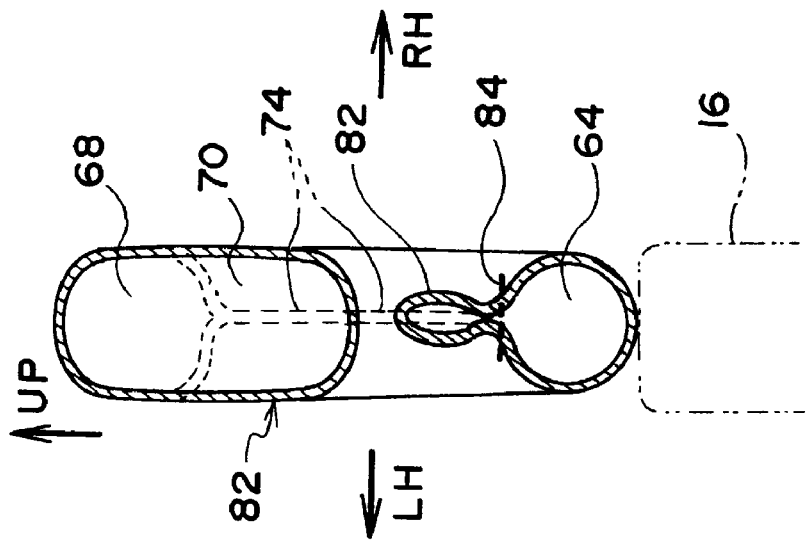
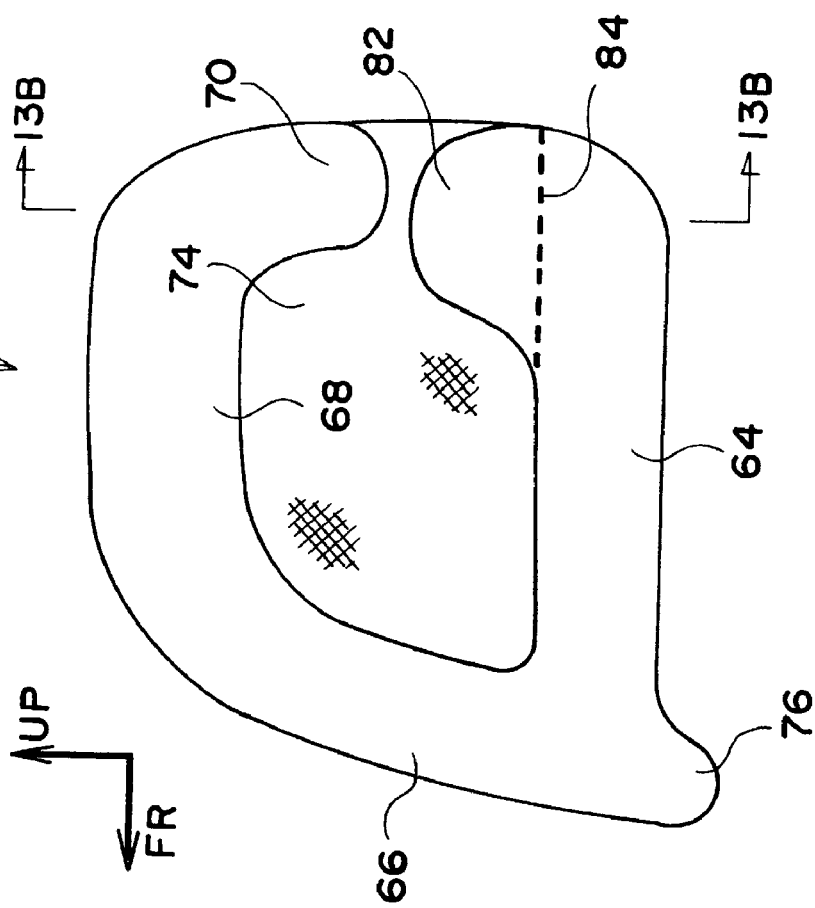

VEHICLE BETWEEN-SEAT AIRBAG APPARATUS

CROSS REFERENCE TO RELATED APPLICATIONS

This application is the U.S. national phase of PCT/JP2008/069645 filed Oct. 29, 2008.

TECHNICAL FIELD

The present invention relates to a vehicle between-seat airbag apparatus.

BACKGROUND ART

A vehicle safety seat is known (see, for example, Japanese Patent Application Laid-Open (JP-A) No. 2004-217109) in which an airbag module is stowed in a rear end portion of a console box, disposed between left and right seatbacks, a notch portion formed in a door that constitutes an upper face of the console box is torn at a time of a side impact, and the airbag is deployed between a driver seat and a passenger seat. According to this structure, movement of a seat occupant to inward in the vehicle lateral direction at a time of side impact is suppressed.

Furthermore, other technologies are known in which an airbag is provided in a center console (see, for example, Japanese Utility Model Application Laid-Open (JP-U) No. 5-3055, JP-A No. 5-208647, JP-A No. 2008-126783 and JP-A No. 2008-155904).

DISCLOSURE OF INVENTION

Problem to be Solved by the Invention

However, in conventional technologies as mentioned above, there is a concern that an airbag provided at the rear end of a console box will be deployed being misplaced to the vehicle rearward side.

In consideration of the circumstances described above, an object of the present invention is to provide a vehicle between-seat airbag apparatus that is capable of properly deploying an airbag that is stowed at a vehicle rear end side of a center console.

Means for Solving the Problem

A vehicle between-seat airbag apparatus relating to a first aspect of the present invention includes: an airbag that is stowed in a corner portion at a vehicle rear end side and upper end side of a center console that is disposed between seats arranged in a vehicle lateral direction, the airbag receiving a gas supply and being inflated; and a bag deployment direction-restricting structure that causes the airbag that receives the gas supply and is inflated to deploy in a vehicle front direction and upward with respect to the corner portion; and an airbag door that is provided at the center console and, by deployment pressure of the airbag, opens an aperture for the airbag to deploy out of the center console, the bag deployment direction-restricting structure being structured to include: a reaction force support portion that is provided at the airbag door; a door attitude retaining structure for retaining an attitude when the airbag door is opening the aperture in a predetermined opened attitude in which the reaction force supporting portion is capable of supporting the airbag from the vehicle rear direction; and a deployment shape of the airbag itself that receives the gas supply and is deployed upward and in the vehicle rear direction after being deployed to the vehicle front direction, and the airbag including: a lower side duct portion that is deployed to the vehicle front direction along a lower edge of the airbag; a front side duct portion that is deployed to upward from a vehicle front end portion of the lower side duct portion; an upper side duct portion that is deployed toward the vehicle rear direction from an upper end portion of the front side duct portion; and a duct linking portion that restricts relative positions of the lower side duct portion, the front side duct portion and the upper side duct portion by tension in a deployment complete state of the duct portions, and being structured so as to be deployed in the order of the lower side duct portion, the front side duct portion and the upper side duct portion.

According to the above aspect, gas is supplied to the airbag, for example, when a side impact against the vehicle in which it is employed is detected or predicted. Receiving this gas supply, the airbag inflates while deploying between the left and right seats. Herein, in the present vehicle between-seat airbag apparatus, the airbag disposed at the corner portion of the center console is deployed to the vehicle upward and forward directions because of the bag deployment direction-restricting structure. That is, the airbag is properly deployed from the corner portion of the center console to between regions of seating of occupants, between the left and right seats.

Thus, with the vehicle between-seat airbag apparatus of the above aspect, the airbag that is stowed at the vehicle rear end side of the center console may be properly deployed.

According to the aspect described above, the airbag door which is changed in attitude, opening the aperture in accordance with the inflation and deployment of the airbag, is retained in the predetermined opened attitude by the door attitude retaining structure, and the airbag is supported from the rear side at the reaction force support portion. Thus, the airbag is deployed to the vehicle front direction and the upper side of the center console. Because the reaction force support portion is provided at the airbag door, which is to say, because the airbag door is combined with the reaction force support portion, the airbag stowed at the vehicle rear side of the center console may be properly deployed while an increase in a number of components is restrained.

According to the aspect described above, the airbag receiving the gas supply deploys in the vehicle front direction because of the deployment shape thereof and then deploys upward and in the vehicle rear direction, and thus is (contributes to being) deployed in the vehicle front direction and upward relative to the aforementioned corner portion of the center console. Moreover, in the present vehicle between-seat airbag apparatus, the airbag that is firstly deployed in the vehicle front direction may push away, for example, an arm of an occupant that is rested on the center console. Therefore, even if an arm was placed on the center console prior to deployment of the airbag, a lengthening of a time required for deployment of the airbag because of the arm is suppressed. That is, a delay in a deployment completion time of the airbag compared to a case in which there is no arm on the center console is reduced.

According to the aspect described above, of the airbag receiving the gas supply, firstly the lower side duct portion is inflated and is deployed in the vehicle front direction, and then the front side duct portion is deployed in the vehicle up direction, and further the upper side duct portion is deployed in the vehicle rear direction. In the deployment complete state, the duct linking portion that is provided so as to be surrounded by the lower side, front side and upper side duct portions retains the relative positions (attitudes) of the lower side, front side and upper side duct portions by tension. Thus, the deployment shape of the airbag that is deployed in the vehicle front direction and then deployed upward and in the vehicle rear direction may be obtained.

The aspect described above may have a constitution in which the duct linking portion of the airbag is a non-inflating portion that is formed in a membrane form or a narrow width portion that is deployed more narrowly in the vehicle lateral direction than the lower side duct portion, the front side duct portion and the upper side duct portion.

According to the aspect described above, because the linking portion is a non-inflating portion or a narrow width portion, volume of the airbag as a whole is reduced. Therefore, in the present vehicle between-seat airbag apparatus, a shortening of a deployment time of the airbag, a reduction in size of the gas supply apparatus, and an improvement in characteristics of loading into the center console with great constraints on space are possible.

The aspect described above may have a constitution in which the airbag further includes a rear side duct portion that is deployed downward from the vehicle rear end side of the upper side duct portion and of which a vehicle front end side is linked to the duct linking portion, and is structured so as to be deployed in the order of the lower side duct portion, the front side duct portion, the upper side duct portion and the rear side duct portion.

According to the aspect described above, the airbag including the rear side duct portion is in a shape close to a ring surrounding the duct linking portion. Therefore, rigidity of the airbag itself with respect to loads in the vehicle lateral direction is assured, and protection of occupants by the airbag is improved.

The aspects described above may have a constitution in which the airbag further includes an upward duct portion that is deployed upward from the vehicle rear end side of the lower side duct portion and of which a vehicle front end side is linked to the duct linking portion.

According to the aspect described above, because the upward duct portion is provided in the vicinity of a portion of the airbag that is supplied with gas, internal pressure of the airbag may be limited.

The aspect described above may have a constitution in which a tear seam, which is sewn so as to be torn when an internal pressure of the airbag is at or above a predetermined value, is provided at a boundary portion between the lower side duct portion and upward duct portion of the airbag.

According to the aspect described above, when the lower side, front side and upper side duct portions are deployed and the internal pressure of the airbag is at or above the predetermined value, the tear seam breaks and the upper duct portion deploys. Thus, after being deployed up to the upper side duct portion in a short time, the airbag internal pressure may be regulated by deployment of the upward duct portion.

The aspects described above may have a constitution in which the airbag further includes an engaging portion that is protruded downward from the vehicle front end side of the lower side duct portion and engages with the center console.

According to the aspect described above, the engaging portion provided at the front end side of the lower side duct portion of the deployed or being-deployed airbag engages with the center console. Therefore, the airbag is supported at the center console at two locations, the rear end side of the center console at which it was stowed and the front end side at which the engaging portion engages with the center console. Thus, the airbag has a stable attitude, particularly with respect to loads acting in the vehicle lateral direction.

The aspects described above may have a constitution in which the airbag is formed such that the lower side airbag is deployed toward the vehicle front direction along an upper face of the center console by gas being supplied through a vehicle rear portion of the lower side airbag.

According to the aspect described above, the airbag may deploy while effectively pushing away, for example, an arm of an occupant that is rested on the center console. The aspects described above may have a constitution in which the duct linking portion of the airbag is structured such that a pair of fabric (sheet) members at different faces in the vehicle lateral direction of the lower side duct portion, the front side duct portion, the upper side duct portion and the rear side duct portion are joined and a cavity is formed thereinside in the deployed state of the airbag, and a vent hole is formed in at least one of the fabric members.

The aspects described above may have a constitution in which the airbag is structured with the lower side duct portion, the front side duct portion, the upper side duct portion and the rear side duct portion being communicated and forming a continuous (linked) ring shape, and an inner duct being further provided, which is provided inside the lower side duct portion, a vehicle rear side end portion of which is fitted to a gas outflow port, and which is opened at a vehicle front side portion of the lower side duct portion.

In the aspects described above, the airbag may have a constitution in which an inflator, which generates gas that is supplied to the airbag, is fixed to the vehicle body via a bracket so as to be separated from the vehicle body in a vehicle vertical direction.

The aspects described above may have a constitution in which the bag deployment direction-restricting structure is provided at the airbag door and is structured to further include a pair of left and right side walls that restrict deployment of the airbag in the vehicle lateral direction.

According to the aspect described above, the airbag door that is retained in the predetermined opened attitude by the door attitude retaining structure supports the airbag from the rear side with the reaction force support portion, and restricts deployment of the airbag in the vehicle lateral direction by the pair of left and right side walls. Thus, in the present vehicle between-seat airbag apparatus, the airbag, deployment of which in the vehicle lateral direction is restrained, is more easily deployed in the vehicle front direction, and the airbag may be even more properly deployed.

The aspects described above may have a constitution in which the door attitude retaining structure is provided at the airbag door and is structured to include a pair of stoppers that, when the airbag door reaches the predetermined attitude, engage with a ceiling of the center console and retain the attitude of the airbag door at the predetermined attitude, and the pair of side walls are formed integrally with the pair of stoppers.

According to the aspect described above, deployment of the airbag in the vehicle lateral direction in the aperture vicinity may be restrained by a simple structure without increasing the number of components.

The aspects described above may have a constitution in which the airbag door is structured such that the aperture opens by a substantially letter U-shaped tear portion, which is formed in a rear face side of the center console and opens to downward, being torn and being turned to the vehicle rearward side with a lower end side serving as a hinge.

According to the aspect described above, when the tear portion, which is formed by an upper edge and left and right side edges thereof, tears, the airbag door turns with a lower end portion, along the vehicle lateral direction, serving as a hinge and the airbag door reaches the predetermined opened attitude. That is, the airbag door turns such that the upper end moves rearward and thus a rearward inclined attitude may serve as the predetermined opened attitude. Thus, a main body portion of the airbag door may serve as the reaction force support portion, and the airbag stowed at the vehicle rear end side of the center console may be properly deployed with a simple structure.

The aspects described above may have a constitution in which the bag deployment direction-restricting structure is structured to further include a pair of left and right side walls that are provided at the airbag door and restrict deployment of the airbag in the vehicle lateral direction, and a pair of vertical tear lines of the letter U-shaped tear portion, which are formed in parallel with one another, are formed at vehicle lateral direction outer sides relative to the pair of side walls.

Effects of the Invention

The vehicle between-seat airbag apparatus relating to the present invention as described above has an excellent effect in that an airbag stowed at the vehicle rear end side of a center console may be properly deployed.

BRIEF DESCRIPTION OF THE DRAWINGS

FIG. 11A is a side view showing a deployment shape of an airbag constituting the vehicle far-side airbag apparatus relating to the second exemplary embodiment of the present invention.

FIG. 11B is a sectional view cut along line 11B-11B of FIG. 11A.

FIG. 11C is a sectional view cut along line 11C-11C of FIG. 11A.

FIG. 13A is a side view showing a deployment complete state of a first variant example of the airbag constituting the vehicle far-side airbag apparatus relating to the second exemplary embodiment of the present invention.

FIG. 13B is a sectional view cut along line 13B-13B of FIG. 13A.

BEST MODE FOR CARRYING OUT THE INVENTION

Figure 1:
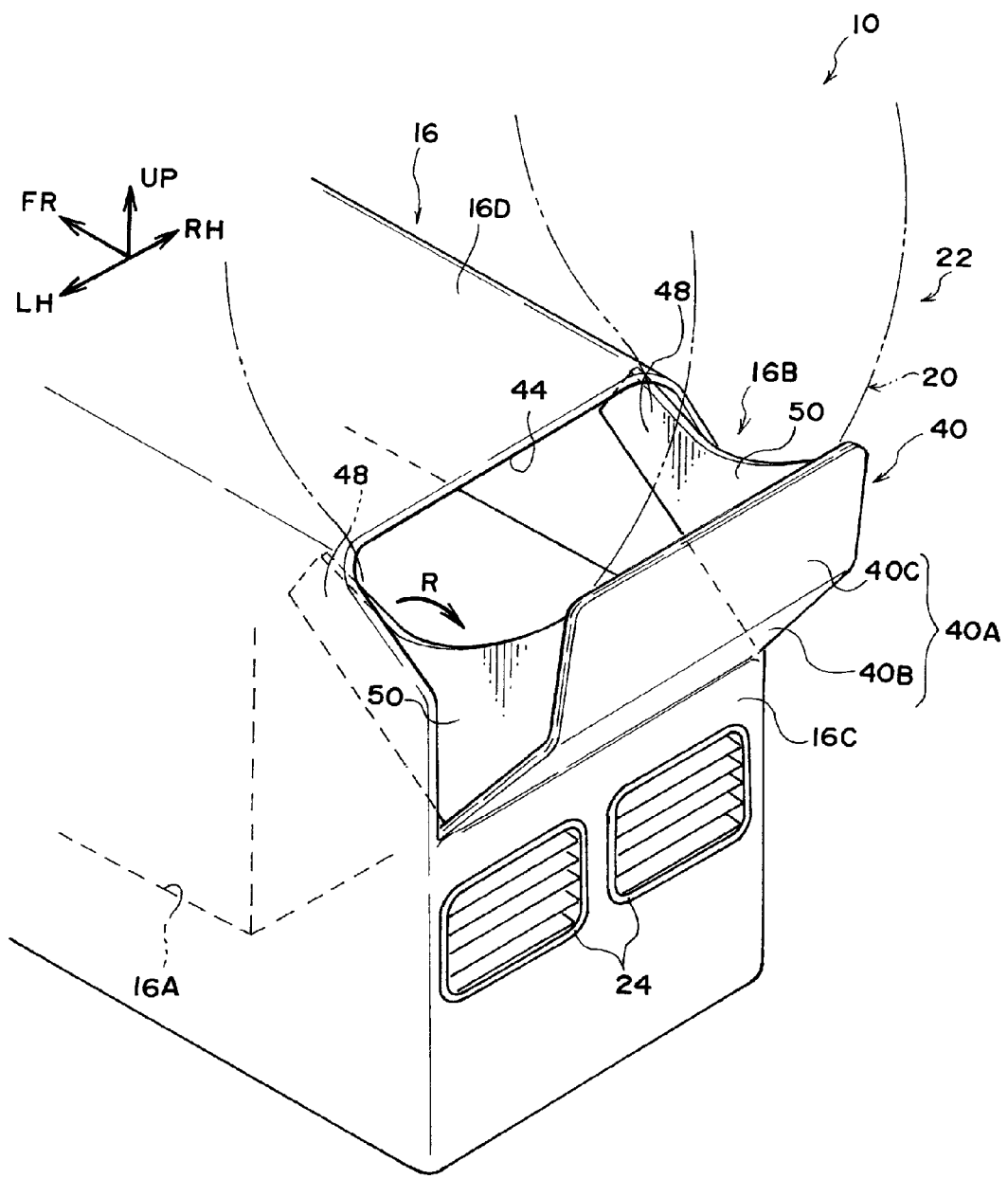
FIG. 1 is a perspective view showing an enlargement of an airbag deployment portion of a vehicle far-side airbag apparatus relating to a first exemplary embodiment of the present invention.

A vehicle far-side airbag apparatus 10, which serves as a vehicle between-seat airbag apparatus relating to a first exemplary embodiment of the present invention, will be described on the basis of FIG. 1 to FIG. 8. An arrow FR, an arrow UP, an arrow RH and an arrow LH that are suitably shown in the drawings indicate, respectively, a vehicle front direction of an automobile M in which the vehicle far-side airbag apparatus 10 is employed, an up direction, and a right side and a left side when facing forward (one way and the other in a vehicle lateral direction). Firstly, principal elements of a structure that is presupposed for employment of the vehicle far-side airbag apparatus 10 in the automobile M will be described, and then the vehicle far-side airbag apparatus 10 will be described.

Figure 6:
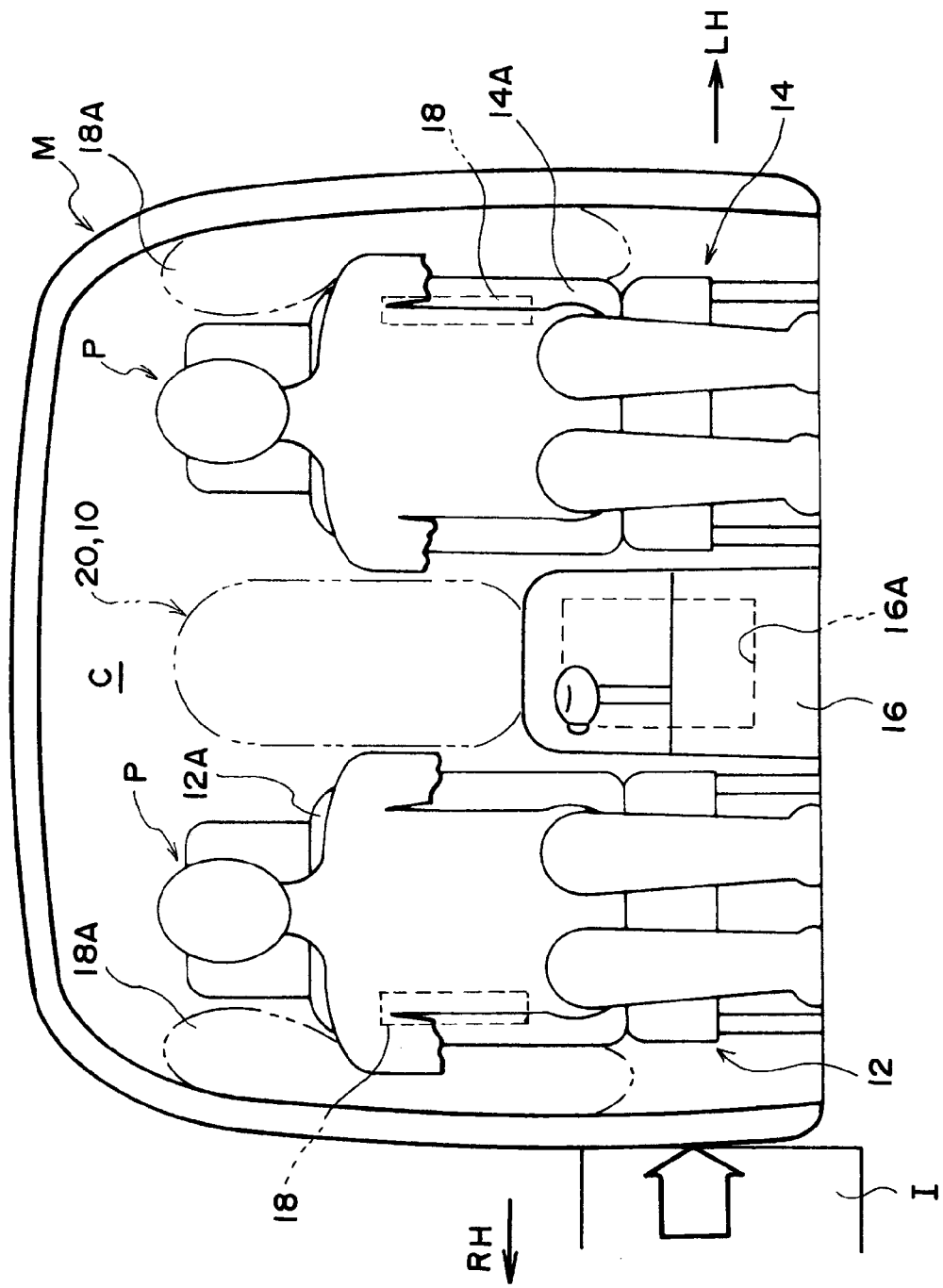
FIG. 6 is a front view schematically showing the interior of a cabin of an automobile in which the vehicle far-side airbag apparatus relating to the first exemplary embodiment of the present invention is employed.

FIG. 6 shows a front portion of the interior of a cabin C of the automobile M in which the vehicle far-side airbag apparatus 10 is employed, in a schematic front view. As shown in this drawing, a driver seat 12 and a passenger seat 14 are disposed as a pair of seats arranged in the vehicle lateral direction (left-right) at a front portion in the cabin C. In the present embodiment, the driver seat 12 is disposed at the right side relative to a vehicle lateral direction central portion of the cabin C interior, and the passenger seat 14 is disposed at the left side relative to the vehicle lateral direction central portion of the cabin C interior. However, the driver seat 12 and the passenger seat 14 may be oppositely arranged between left and right.

Figure 7:
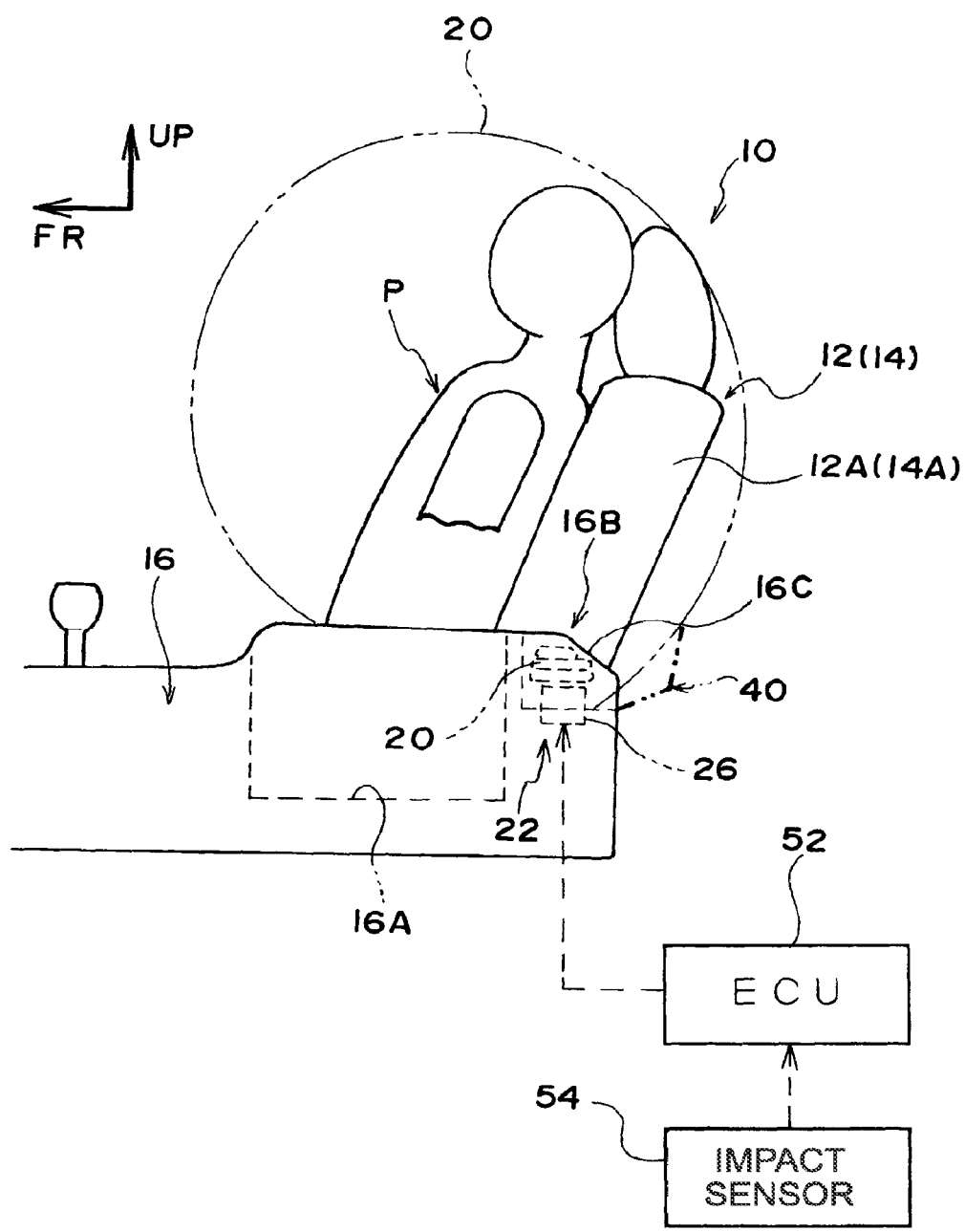
FIG. 7 is a side view schematically showing the interior of the cabin of the automobile in which the vehicle far-side airbag apparatus relating to the first exemplary embodiment of the present invention is employed.

A center console (also referred to as a console box) 16 which serves as a cabin interior member is disposed between the driver seat 12 and the passenger seat 14. The center console 16 extends along the vehicle front-rear direction and, as shown in FIG. 7, a rear end portion thereof reaches to between seatbacks 12A and 14A of the driver seat 12 and the passenger seat 14. A stowing cavity 16A that serves as a stowing portion is provided at a portion in the vehicle front-rear direction of the center console 16.

Further, as shown in FIG. 6, respective side airbag apparatuses 18 are provided at vehicle lateral direction outer side regions of the seatbacks 12A and 14A of the driver seat 12 and the passenger seat 14. The side airbag apparatuses 18 are structured such that, when a side impact is detected or predicted, unillustrated inflators are operated and thus side airbags 18A (see the imaginary lines in FIG. 6) receiving gas supplies from the inflators are inflated and deployed at the vehicle lateral direction outer sides relative to seat occupants P of the driver seat 12 and the passenger seat 14. Therefore, the side airbag apparatuses 18 act to suppress movements to the vehicle lateral direction outer sides of the seat occupants P of the driver seat 12 and the passenger seat 14.

The vehicle far-side airbag apparatus 10 is employed in the automobile M and is a structure that deploys a far-side airbag 20, which serves as an airbag of the present invention, above the center console 16 as shown in FIG. 6 and FIG. 7. Thus, the vehicle far-side airbag apparatus 10 is a structure that suppresses movements to the vehicle lateral direction inner sides of the seat occupants P of the driver seat 12 and the passenger seat 14. It is specifically described below.

Figure 2:
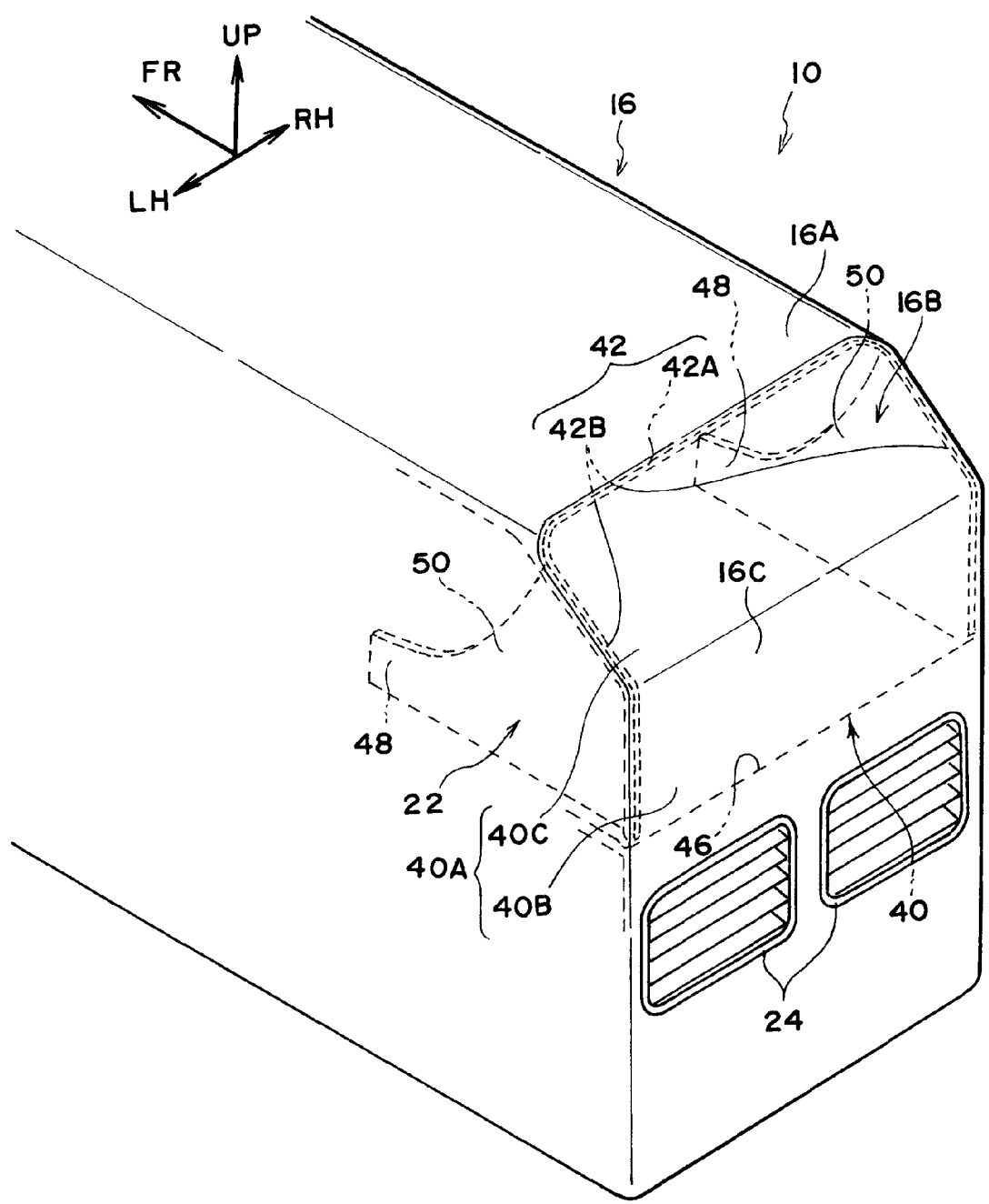
FIG. 2 is a perspective view showing an enlargement of principal portions prior to deployment of the airbag of the vehicle far-side airbag apparatus relating to the first exemplary embodiment of the present invention.

As shown in FIG. 7, the vehicle far-side airbag apparatus 10 is disposed at a corner portion 16B at the vehicle rear end side and upper end side of the center console 16. More specifically, an airbag door 40, which will be described later, is provided at the corner portion 16B of the center console 16, and an airbag module 22 is disposed in a cavity in the center console 16 that is closed off by the airbag door 40. As shown in FIG. 1 and FIG. 2, an air conditioning outflow port 24 for a rear seat is disposed in a rear face of the center console 16 below the location of disposition of the airbag module 22.

Figure 4:
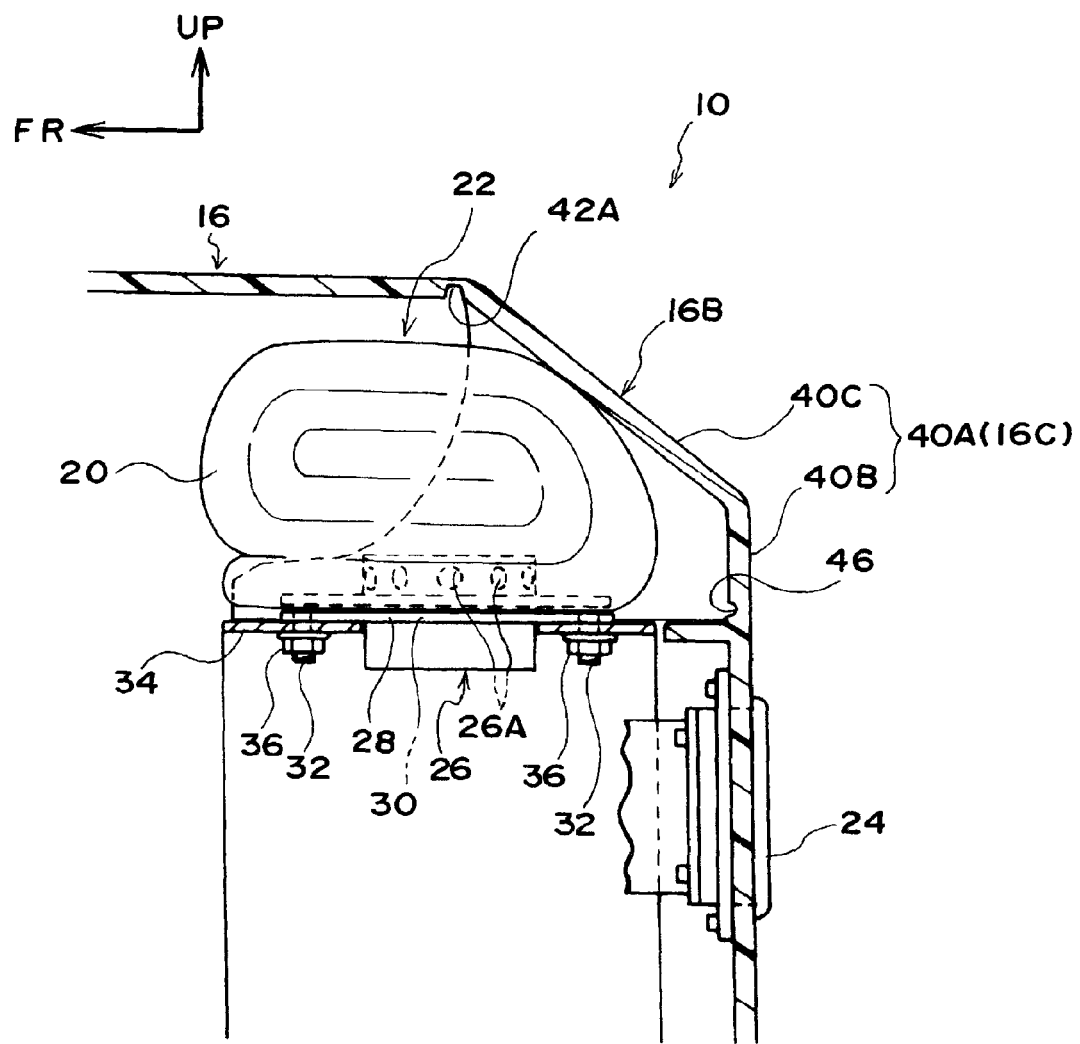
FIG. 4 is a side sectional view showing an enlargement of principal portions prior to deployment of the airbag of the vehicle far-side airbag apparatus relating to the first exemplary embodiment of the present invention.
Figure 9:
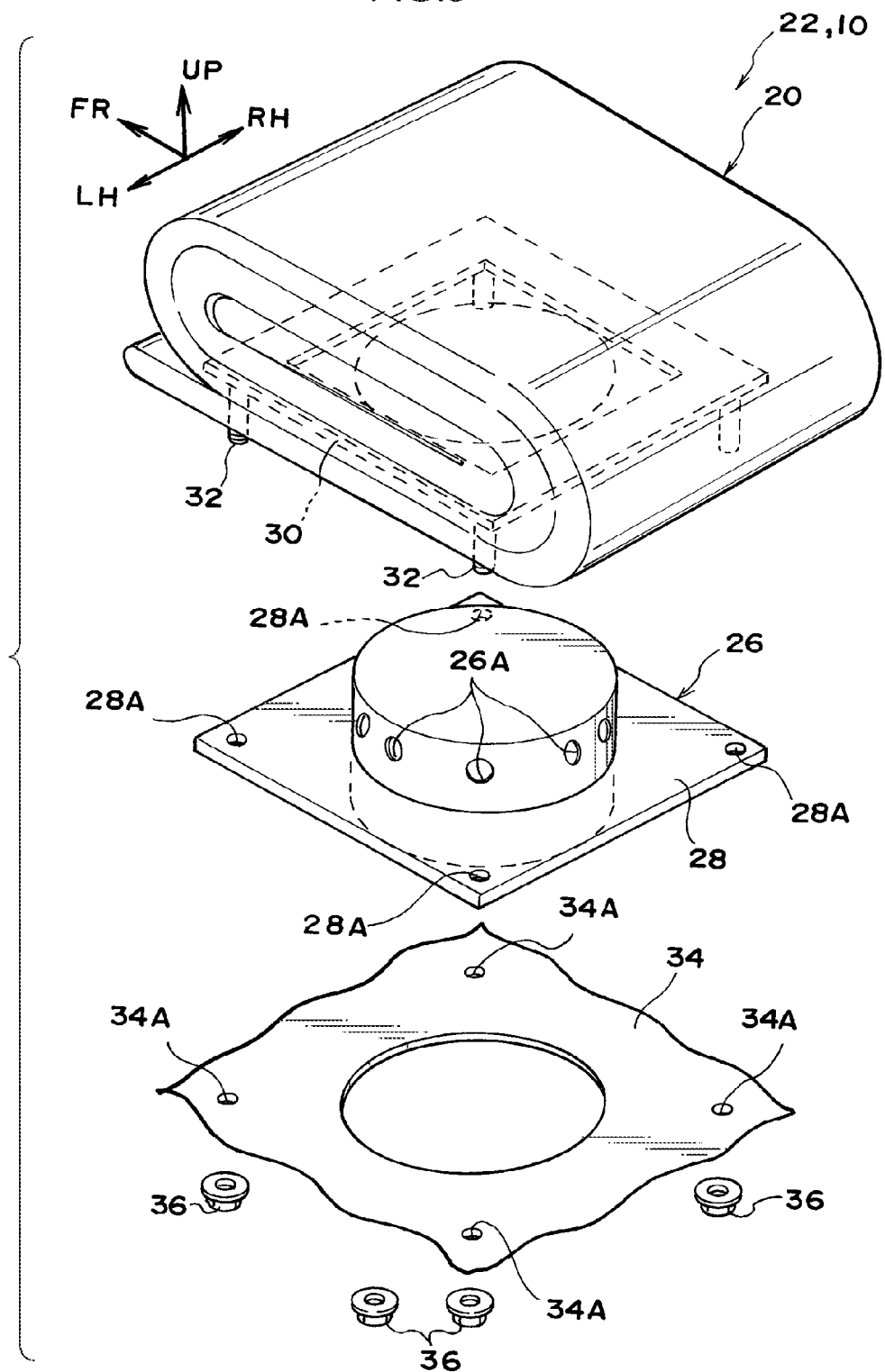
FIG. 9 is an exploded perspective view showing an airbag module constituting the vehicle far-side airbag apparatus relating to the first exemplary embodiment of the present invention.

As shown in FIG. 4, the airbag module 22 is structured to include the far-side airbag 20, which is folded up in a predetermined shape, and an inflator 26, which serves as a gas supply apparatus for supplying gas to the far-side airbag 20. In this exemplary embodiment, the inflator 26 is an inflator of what is known as a disc type, which is constituted in a short cylindrical shape, and, as shown in FIG. 9, a flange 28 is formed between a lower portion, which is filled with a gas generator, and an upper portion, in which a gas outflow port 26A is formed.

Figure 5:
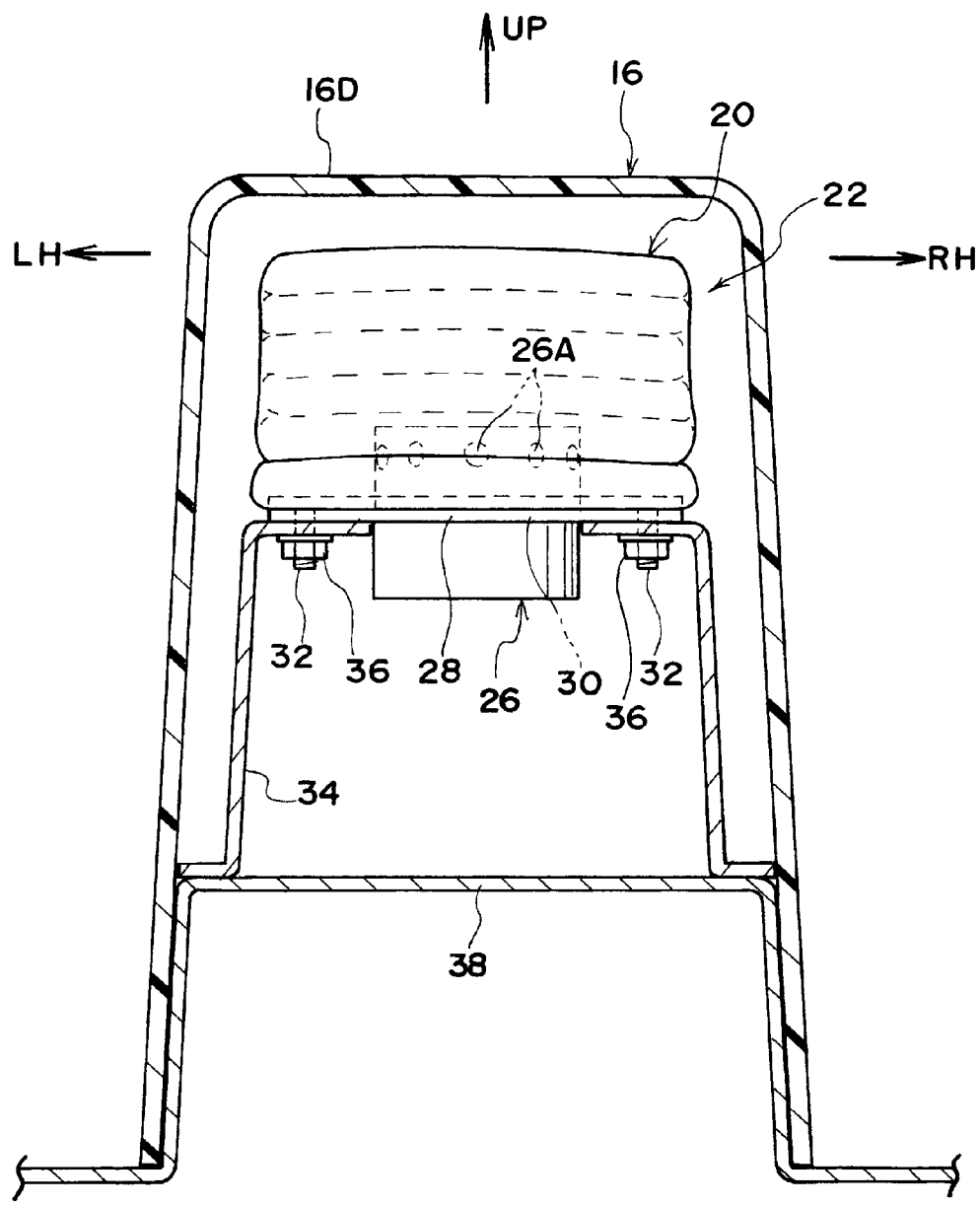
FIG. 5 is a rear sectional view showing an enlargement of portions prior to deployment of the airbag of the vehicle far-side airbag apparatus relating to the first exemplary embodiment of the present invention.

The flange 28 is constituted in a substantially rectangular shape in plan view, and through-holes 28A are formed therein for inserting bolts 32 that protrude from a retainer 30 provided inside the far-side airbag 20. In the airbag module 22, nuts 36 are threadingly engaged with the bolts 32 that are inserted into the through-holes 28A and through-holes 34A of a bracket 34. Thus, as shown in FIG. 4 and FIG. 5, the far-side airbag 20 and the inflator 26 are fixed to a bracket 34. In this state, the gas outflow port 26A is disposed inside the far-side airbag 20. Thus, the far-side airbag 20 and the inflator 26 are formed into a module at the bracket 34.

As shown in FIG. 5, the bracket 34 is fixed by welding, fastening or the like to a floor tunnel 38 that supports the center console 16. The airbag module 22, which is fixed to the vehicle body by the bracket 34 in this manner, is covered by a console panel 16C that structures an outer shell of a rear end portion of the center console 16. The airbag door 40, which opens (forms) an opening 44 (see FIG. 1) for deploying the airbag module 22 out of the center console 16, is provided at this console panel 16C.

Figure 8:
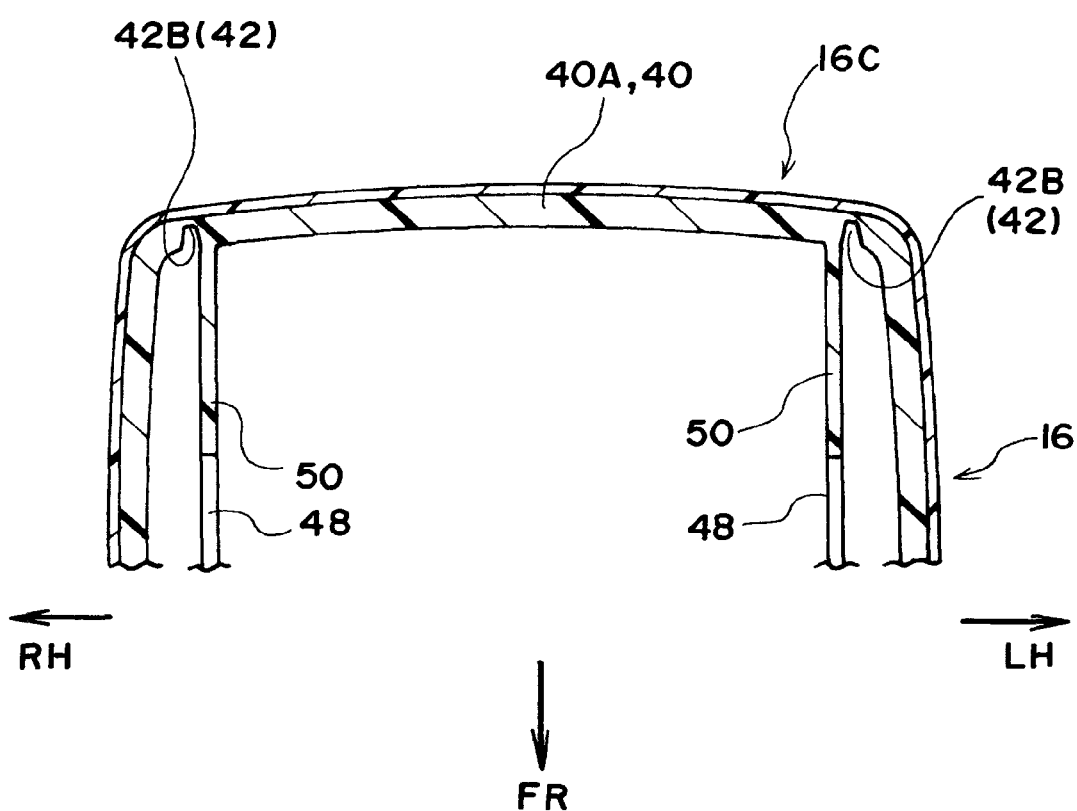
FIG. 8 is a sectional plan view showing an airbag door constituting the vehicle far-side airbag apparatus relating to the first exemplary embodiment of the present invention.

Specifically, as shown in FIG. 2, at a region of the console panel 16C of the center console 16 that constitutes the corner portion 16B, a tear line 42 is formed that serves as a tear portion formed by edge portions of the airbag door 40. The tear line 42 forms a substantial letter U shape, which is machined in a downward orientation in rear view, of a horizontal tear line 42A and a pair of left and right vertical tear lines 42B, which vertically extend from the vehicle lateral direction two ends of the horizontal tear line 42A. As shown in FIG. 4, the horizontal tear line 42A is formed as a groove (a thinned portion). Similarly, as shown in FIG. 8, the pair of left and right vertical tear lines 42B are formed as grooves (thinned portions).

In this exemplary embodiment, as shown in FIG. 2 and FIG. 4, the tear line 42 is formed from a region of the console panel 16C that covers the airbag module 22 from behind to a region that covers it from diagonally above-behind. Accordingly, a door main body 40A of the airbag door 40 is structured with a standing wall portion 40B, along a substantially vertical plane, and an inclined wall 40C, which extends upward and in the vehicle front direction from an upper end of the standing wall portion 40B, as principal portions.

This airbag door 40 has a structure in which the opening 44 for the far-side airbag 20 to deploy out of the center console 16 is formed in the console panel 16C by the tear line 42 being torn (split open). At that time, the airbag door 40 turns in the direction shown by arrow R in FIG. 1 and FIG. 3 with a lower end portion thereof serving as a hinge. Specifically, as shown in FIG. 2 and FIG. 4, the airbag door 40 includes a groove-form hinge portion (a flexing start point) 46 along the vehicle lateral direction, which is formed so as to join the lower ends of the left and right vertical tear lines 42B, and turns about the hinge portion 46 when the tear line 42 is torn.

Figure 3:
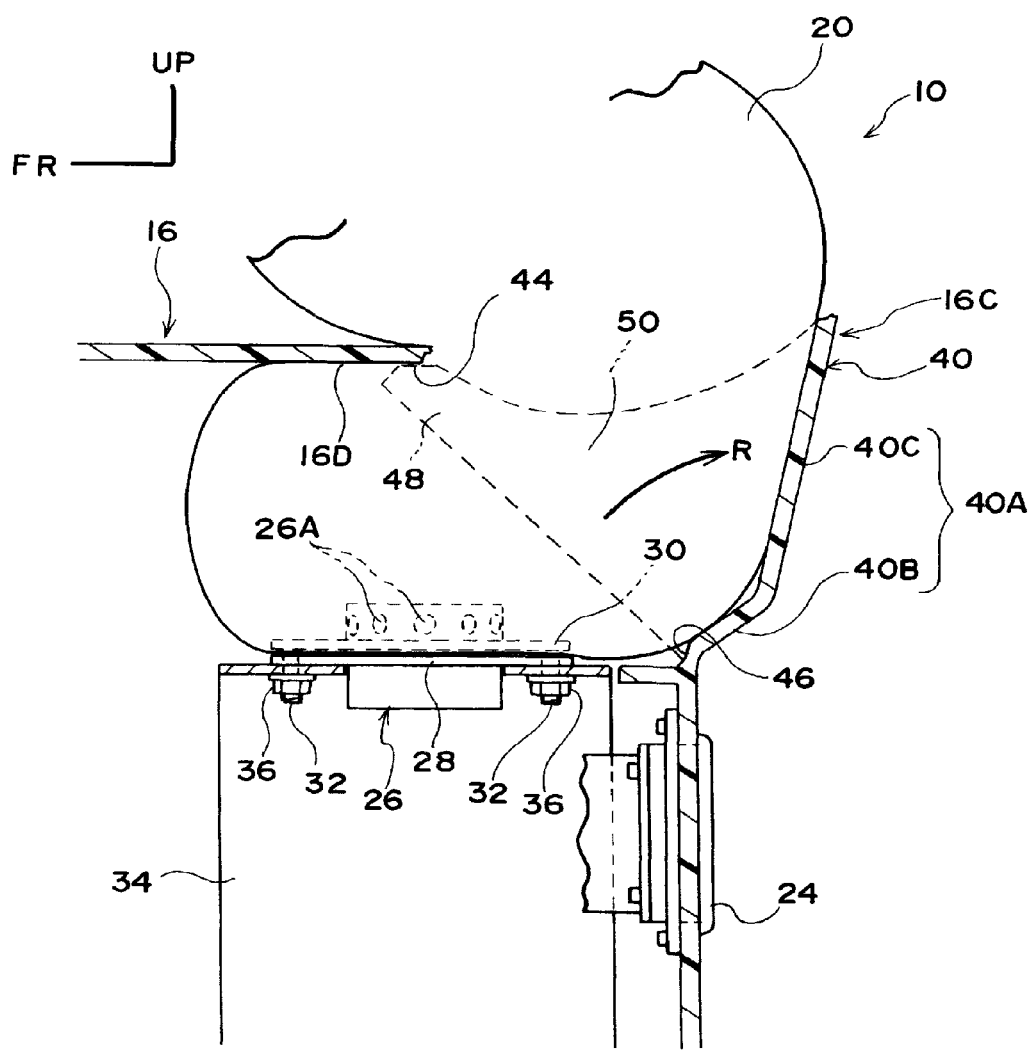
FIG. 3 is a side sectional view showing an enlargement of the airbag deployment portion of the vehicle far-side airbag apparatus relating to the first exemplary embodiment of the present invention.

In the vehicle far-side airbag apparatus 10, as shown in FIG. 1 and FIG. 3, stoppers 48 are provided to serve as a door attitude retaining structure, which restricts turning of the airbag door 40 in the direction of arrow R beyond a predetermined value. As shown in FIG. 2, prior to deployment of the airbag door 40, the stoppers 48 protrude out to forward from a region of the console panel 16C at the inner side of the tear line 42. In this exemplary embodiment, as shown in FIG. 8, the stoppers 48 are provided as a left and right pair in vicinities of the vehicle lateral direction two ends of the airbag door 40 (the left and right vertical tear lines 42B) so as not to interfere with the far-side airbag 20.

The stoppers 48 are structures of which, when the airbag door 40 turns by a predetermined angle to arrow R, distal ends thereof engage with an upper wall 16D that forms a ceiling of the center console 16, and thus restrict rotation of the airbag door 40 in the direction of arrow R therebeyond. In the following description, the attitude (position) of the airbag door 40 in the state in which the stoppers 48 engage with the upper wall 16D is referred to as the opened attitude. This opened attitude, as shown in FIG. 1 and FIG. 3, is an attitude in which the door main body 40A of the airbag door 40 is inclined substantially rearward as a whole. The door main body 40A is a structure that supports the far-side airbag 20, which inflates due to gas supply from the inflator 26, from the vehicle rear side. Thus, the door main body 40A corresponds to a reaction force support portion (a reaction force surface) of the present invention.

In the vehicle far-side airbag apparatus 10, a pair of left and right side walls 50 are provided for restricting deployment of the far-side airbag 20 in the vehicle rear direction. The side walls 50 are formed integrally with the airbag door 40. In this exemplary embodiment, the left and right side walls 50 are formed so as to reach from the stoppers 48, which are provided extending in the vehicle front direction from the lower end of the airbag door 40 prior to deployment, to the upper end of the airbag door 40. In other words, the respective stoppers 48 may also be understood as objects that are provided extending in the vehicle front direction from the lower ends of the left and right side walls 50.

As shown in FIG. 1 and FIG. 3, in the state in which the airbag door 40 assumes the opened attitude, the left and right side walls 50 protrude between edge portions of the opening 44 and the door main body 40A, and restrict deployment of the far-side airbag 20 in the vehicle lateral direction from between the edge portions of the opening 44 and the airbag door 40. Given the above, in the present exemplary embodiment, the airbag door 40 including at least the door main body 40A and the stoppers 48 structures a bag deployment direction-restricting structure of the present invention.

As shown in FIG. 7, the vehicle far-side airbag apparatus 10 is further provided with an ECU 52 that controls operation of the inflator 26. When a side impact is detected or predicted on the basis of a signal from a side impact sensor 54, the ECU 52 causes the inflator 26 to operate. In this exemplary embodiment, the ECU 52 further incorporates functions that control operations of the left and right side airbag apparatuses 18, and may be considered as a control apparatus for responding to side impacts.

Next, operation of the present exemplary embodiment will be described.

In the vehicle far-side airbag apparatus 10 of the structure described above, when a side impact of an impact body I against the automobile M (see FIG. 6) is detected or predicted on the basis of a signal from the side impact sensor 54, the ECU 52 causes the left and right side airbag apparatuses 18 to operate and also causes the inflator 26 to operate. Accordingly, the far-side airbag 20, which receives a gas supply from the inflator 26, is inflated inside the center console 16, and presses against the console panel 16C from inside.

When a deployment pressure (inflation pressure) of the far-side airbag 20 that acts on the console panel 16C exceeds a predetermined value, the tear line 42 is torn. Accordingly, the airbag door 40 is pressed by the far-side airbag 20, turns in the direction of arrow R about the hinge portion 46, and is deployed. Thus, the opening 44 is formed (opened) in the corner portion 16B of the center console 16, and the far-side airbag 20 deploys to outside the center console 16 through this opening 44.

The airbag door 40 reaches the opened position when the stoppers 48 engage with the upper wall 16D of the center console 16, and rotation therebeyond in the direction of arrow R is restricted. In this opened attitude, as shown in FIG. 1 and FIG. 3, the door main body 40A of the airbag door 40 supports the far-side airbag 20 from the vehicle rear side in the process of inflation and deployment. That is, a reaction force associated with deployment of the far-side airbag 20 to forward is supported by the door main body 40A.

Thus, in the vehicle far-side airbag apparatus 10, as shown in FIG. 7, the far-side airbag 20 deploys in the vehicle front direction and upward (at the upper side of the center console 16) from the console panel 16C of the center console 16. A side opposite the impact of the impact body I (a seat occupant P of the passenger seat 14 in the example in FIG. 6) is restrained in movement to the vehicle lateral direction inner side (the driver seat 12 side) by the far-side airbag 20 that has deployed in this manner. Moreover, a seat occupant P of the driver seat 12, who is protected by the side airbag 18A of the side airbag apparatus 18 at an initial period of the side impact, swings back and moves to the vehicle lateral direction inner side (the passenger seat 14 side) but is restrained by the far-side airbag 20.

As described hereabove, in the vehicle far-side airbag apparatus 10, when the far-side airbag 20 is being inflated and deployed, the door main body 40A of the airbag door 40 supports the far-side airbag 20 from the vehicle rear side. Therefore, the far-side airbag 20 deploys properly to the vehicle front direction and the upper side of the center console 16, that is, between the seat occupants of the driver seat 12 and the passenger seat 14, without deploying toward the rear side (being misplaced) from the corner portion 16B of the center console 16.

In the vehicle far-side airbag apparatus 10, the stoppers 48 provided at the airbag door 40 engage with the upper wall 16D of the center console 16, and thus the airbag door 40 is retained in the opened attitude described earlier. Therefore, the airbag door 40 supports the far-side airbag 20 at a proper position with the door main body 40A, and contributes to the far-side airbag 20 properly deploying as described above.

In the vehicle far-side airbag apparatus 10, the far-side airbag 20 is restricted from deploying in the vehicle lateral direction at vicinities of the opening 44 by the pair of left and right side walls 50. Therefore, the pair of left and right side walls 50 contribute to the far-side airbag 20 properly deploying toward the vehicle front direction as described above. Moreover, in the vehicle far-side airbag apparatus 10, because the pair of left and right side walls 50 are integrated with the airbag door 40 (the stoppers 48), deployment of the far-side airbag 20 in the vehicle lateral direction at the vicinities of the opening 44 may be restrained by a simple structure without increasing the number of components.

Further yet, in the vehicle far-side airbag apparatus 10, when the substantially letter U-form tear line 42 is torn by the deployment pressure of the far-side airbag 20, the airbag door 40 that is formed by the corner portion 16B of the center console 16 turns rearward about the hinge portion 46 that is formed by the lower end and thus the opening 44 opens up. Therefore, a rearward inclined attitude in which the door main body 40A faces the vehicle front side and upward, which is the deployment direction of the far-side airbag 20, may serve as the opened attitude (a bag support attitude). Thus, with the vehicle far-side airbag apparatus 10, a function of restricting the deployment direction of the far-side airbag 20 with the door main body 40A of the airbag door 40 may be realized with a simple structure.

With the vehicle far-side airbag apparatus 10, because the airbag module 22 is provided at the corner portion 16B of the center console 16, stowing capability and volume of the stowing cavity 16A of the center console 16 may be assured. In other words, with the vehicle far-side airbag apparatus 10, with a structure in which the airbag module 22 is disposed at the corner portion 16B, which is advantageous in terms of stowing capability and usability of the center console 16, the far-side airbag 20 may be properly deployed as described above.

In the above-described first exemplary embodiment, an example is illustrated in which the pair of left and right side walls 50 are provided at the airbag door 40, but the present invention is not to be limited thus. For example, a structure not including the pair of left and right side walls 50 is also possible.

Second Exemplary Embodiment

Next, a second exemplary embodiment of the present invention will be described. Components and portions that are basically the same as structures of the above-described first exemplary embodiment are assigned the same reference numerals as the structures of the above-described first exemplary embodiment and will not be described.

Figure 10:
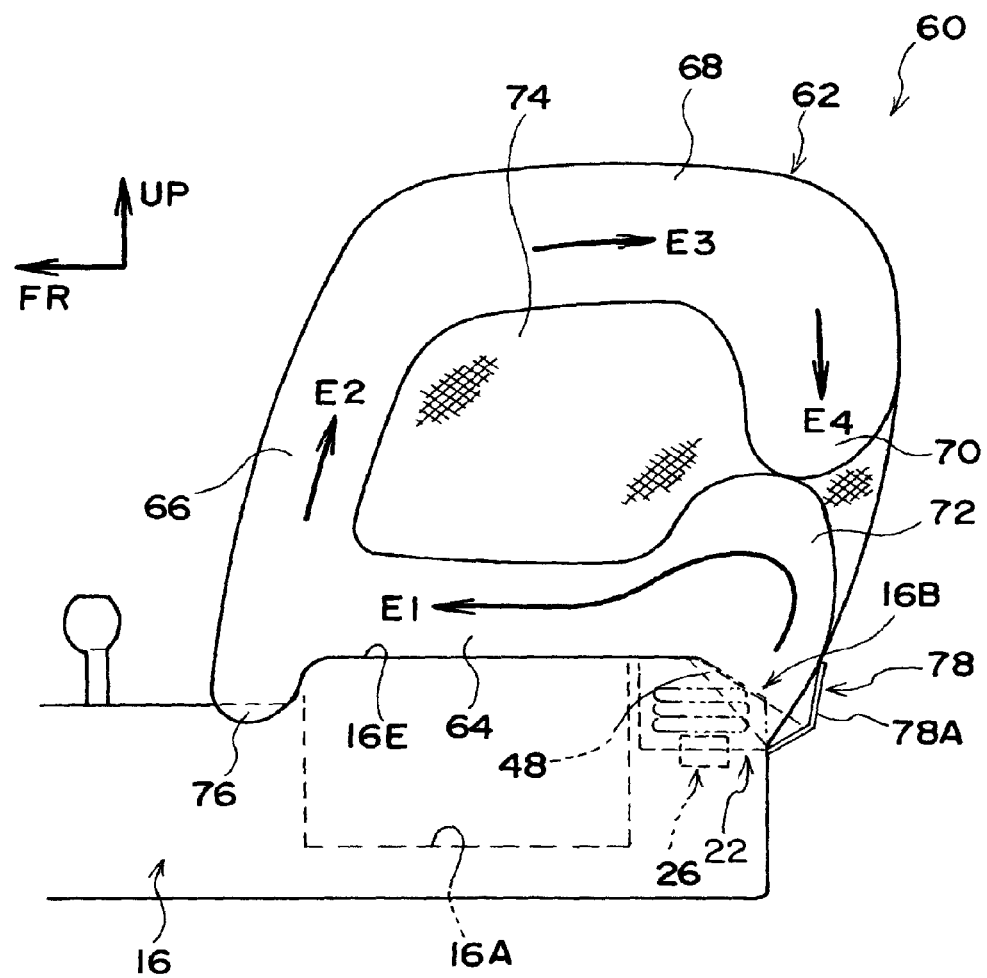
FIG. 10 is a side view schematically showing the interior of a cabin of an automobile in which a vehicle far-side airbag apparatus relating to a second exemplary embodiment of the present invention is employed.

FIG. 10 shows an operation state of a vehicle far-side airbag apparatus 60 relating to the second exemplary embodiment of the present invention in a side view. As shown in this drawing, the vehicle far-side airbag apparatus 60 differs from the vehicle far-side airbag apparatus 10 relating to the first exemplary embodiment in that a far-side airbag 62 including plural duct portions that are deployed successively is provided instead of the far-side airbag 20 with the single bag structure that is inflated and deployed as a whole. Herebelow, the far-side airbag 62 will be described on the basis of a form in which, basically, it receives a gas supply from the inflator 26 and deploys.

As shown in FIG. 11A, the far-side airbag 62 includes a lower side duct portion 64 that deploys along a lower edge portion thereof, a front side duct portion 66 that extends upward from the vehicle front end of the lower side duct portion 64, an upper side duct portion 68 that extends in the vehicle rear direction from an upper end of the front side duct portion 66, and a rear side duct portion 70 that extends downward from a vehicle rear end of the upper side duct portion 68. In this exemplary embodiment, the far-side airbag 62 further includes an upward duct portion 72 that extends upward from the vehicle rear end of the lower side duct portion 64. Thus, the far-side airbag 62 as a whole is formed in a substantial ring shape in side view, of the lower side duct portion 64, the front side duct portion 66, the upper side duct portion 68, the rear side duct portion 70 and the upward duct portion 72.

The far-side airbag 62 includes a duct linking portion 74 that is surrounded by the lower side duct portion 64, front side duct portion 66, upper side duct portion 68, rear side duct portion 70 and upward duct portion 72 and that links the same. As shown in FIG. 11B, in the far-side airbag 62, two base sheets (fabrics) that are cut to a shape similar to a side view shape of the far-side airbag 62 are superposed such that coated faces, of silicon coatings or the like, are at inner faces, peripheral edge portions thereof are sewed up, and thus the duct portions 64 to 72 are formed. The duct linking portion 74 is structured by sewing a separate sheet (fabric) to sewing portions at inner edge sides of the duct portions 64 to 72. Thus, the duct linking portion 74 is formed as a membrane-form non-inflating portion. The far-side airbag 62 may also be formed by hollow weaving. The duct linking portion 74 may also be provided as a narrow width portion which deploys more narrowly in the vehicle lateral direction than the duct portions 64 to 72.

The airbag module 22 that is provided with the far-side airbag 62 instead of the far-side airbag 20 supplies gas of the inflator 26 into the far-side airbag 62 from the vehicle rear end of the lower side duct portion 64, as shown in FIG. 10. Therefore, the far-side airbag 62 deploys in the order: the lower side duct portion 64 (the upward duct portion 72), the front side duct portion 66, the upper side duct portion 68, the rear side duct portion 70. Relative positions of these duct portions 64 to 72 are retained by tension of the duct linking portion 74.

Further, the far-side airbag 62 includes engagement protrusion portions 76 which serve as engagement protrusions that are protruded downward from the vehicle front end of the lower side duct portion 64. As shown in FIG. 10 and FIG. 11C, the engagement protrusion portions 76 sandwich the center console 16 from both sides in the vehicle lateral direction. The engagement protrusion portions 76 deploy with a timing the same as the front side duct portion 66 or slightly quicker.

The vehicle far-side airbag apparatus 60 is provided with an airbag door 78 instead of the airbag door 40. The airbag door 78 differs from the airbag door 40 in the respect of not including the pair of left and right side walls 50. Other portions are structured similarly to the airbag door 40. That is, the airbag door 78 is deployed by the tear line 42 being torn and has a structure in which, in the opened attitude in which the stoppers 48 are engaged with the upper wall 16D, a door main body 78A thereof supports the far-side airbag 62 from the vehicle rear direction. Clearly, the airbag door 78 may be structured to include the pair of left and right side walls 50.

In the present exemplary embodiment, the deployment shape of the far-side airbag 62, of which the lower side duct portion 64 is deployed in the vehicle front direction first, itself structures the bag deployment direction-restricting structure of the present invention together with the airbag door 78.

An armrest 16E, for an occupant among the seat occupants P of the driver seat 12 and the passenger seat 14 to rest an arm (elbow) on is provided at the center console 16 structuring the vehicle far-side airbag apparatus 60 described above, in the vehicle front direction relative to the corner portion 16B (the position of provision of the airbag module 22). Other structures of the vehicle far-side airbag apparatus 60 are structured similarly to the corresponding structures of the vehicle far-side airbag apparatus 10, including unillustrated portions.

Next, operations of the second exemplary embodiment will be described.

In the vehicle far-side airbag apparatus 60 of the structure described above, when a side impact of an impact body I against the automobile M (see FIG. 6) is detected or predicted on the basis of a signal from the side impact sensor 54, the ECU 52 causes the left and right side airbag apparatuses 18 to operate and also causes the inflator 26 to operate. Accordingly, the far-side airbag 62, which receives a gas supply from the inflator 26, is inflated inside the center console 16, and presses against the console panel 16C from inside.

When a deployment pressure (inflation pressure) of the far-side airbag 62 that acts on the console panel 16C exceeds a predetermined value, the tear line 42 is torn. Accordingly, the airbag door 78 is pressed by the far-side airbag 62, turns in the direction of arrow R about the hinge portion 46, and deploys. Thus, the opening 44 is formed in the corner portion 16B of the center console 16, and the far-side airbag 62 deploys to outside the center console 16 through this opening 44.

The airbag door 78 reaches the opened position when the stoppers 48 engage with the upper wall 16D of the center console 16, and rotation therebeyond in the direction of arrow R is restricted. In this opened attitude, as shown in FIG. 1, the door main body 78A of the airbag door 78 supports the far-side airbag 62 from the vehicle rear side in the process of inflation and deployment. That is, a reaction force associated with deployment of the far-side airbag 62 to forward is supported by the door main body 78A.

Figure 12A:
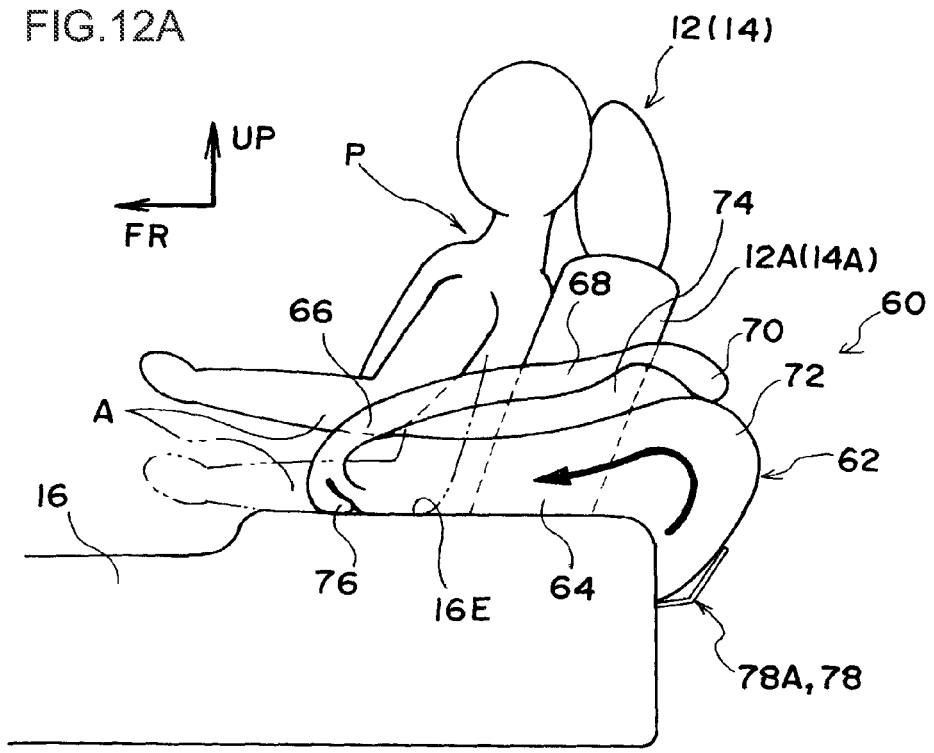
FIG. 12A is a side view schematically showing a state at an initial period of deployment of the airbag of the vehicle far-side airbag apparatus relating to the second exemplary embodiment of the present invention.
Figure 12B:
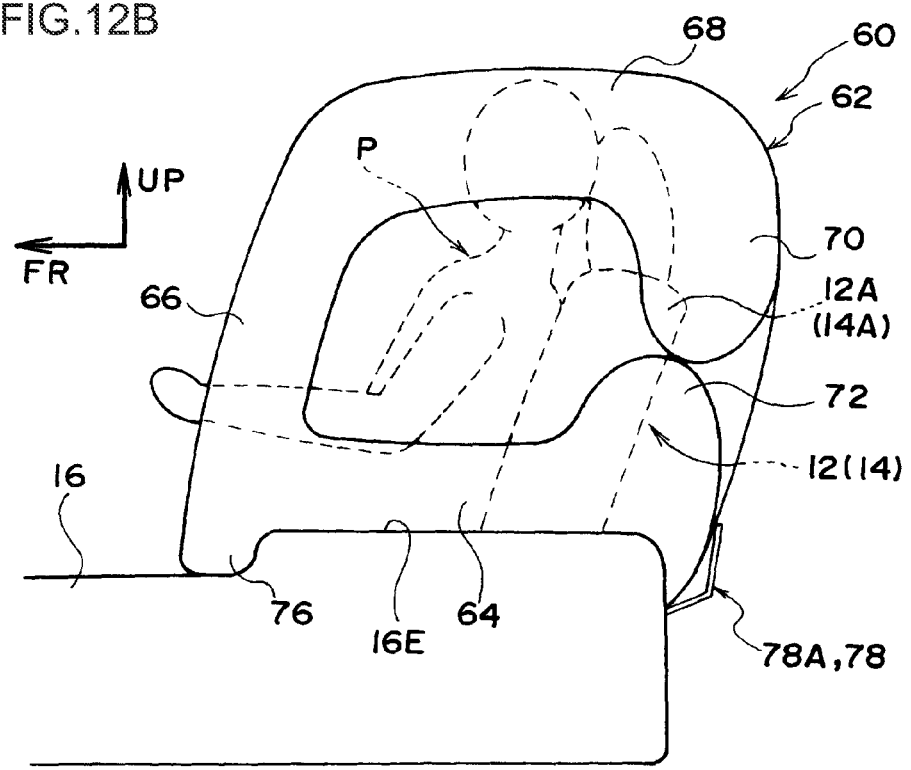
FIG. 12B is a side view schematically showing an airbag deployment complete state of the vehicle far-side airbag apparatus relating to the second exemplary embodiment of the present invention.

Thus, in the vehicle far-side airbag apparatus 60, as shown in FIG. 12A, the far-side airbag 62 first deploys the upward duct portion 72 while the lower side duct portion 64 deploys to the vehicle front direction along the upper face of the center console 16 (see arrow E1 in FIG. 10). Then, of the far-side airbag 62, the engagement protrusion portions 76 are protruded downward from the vehicle front end of the lower side duct portion 64, and the front side duct portion 66 deploys upward (see arrow E2 in FIG. 10). Further, of the far-side airbag 62, the upper side duct portion 68 deploys to the vehicle rear direction from the upper end of the front side duct portion 66 (see arrow E3 in FIG. 10). Then, when the rear side duct portion 70 deploys downward from the vehicle rear end of the upper side duct portion 68 (see arrow E4 in FIG. 10), the far-side airbag 62 completes deployment to the predetermined shape, as shown in FIG. 12B.

The side opposite the impact of the impact body I (the seat occupant P of the passenger seat 14 in the example in FIG. 6) is restrained in movement to the vehicle lateral direction inner side (the driver seat 12 side) by the far-side airbag 62 that has deployed in this manner. Moreover, the seat occupant P of the driver seat 12, who is protected by the side airbag 18A of the side airbag apparatus 18 at the initial period of the side impact, swings back and moves to the vehicle lateral direction inner side (the passenger seat 14 side) but is restrained by the far-side airbag 62.

As described hereabove, in the vehicle far-side airbag apparatus 60, when the far-side airbag 62 is being inflated and deployed, the door main body 78A of the airbag door 78 supports the far-side airbag 62 from the vehicle rear side. Moreover, because the far-side airbag 62 has a structure in which the lower side duct portion 64 is deployed first, directionality of the deployment direction is stronger than with an airbag of a shape that inflates and deploys as a whole, and it is unlikely to deploy to the vehicle rear direction. For these reasons, the far-side airbag 62 deploys properly to the vehicle front direction and the upper side of the center console 16, that is, between the seat occupants of the driver seat 12 and the passenger seat 14, without deploying rearward from the corner portion 16B of the center console 16.

In the vehicle far-side airbag apparatus 60, the stoppers 48 provided at the airbag door 78 engage with the upper wall 16D of the center console 16, and thus the airbag door 78 is retained in the opened attitude described earlier. Therefore, the airbag door 78 supports the far-side airbag 62 at a proper position with the door main body 78A, and contributes to the far-side airbag 62 properly deploying as described above.

In the vehicle far-side airbag apparatus 60, when the substantially letter U-form tear line 42 is torn by the deployment pressure of the far-side airbag 62, the airbag door 78 that is formed by the corner portion 16B of the center console 16 turns rearward about the hinge portion 46 that is formed by the lower end and thus the opening 44 opens up. Therefore, a rearward inclined attitude in which the door main body 78A directs the far-side airbag 20 to the vehicle front side and upward, which is the deployment direction, may serve as the opened attitude (a bag support attitude). Thus, with the vehicle far-side airbag apparatus 60, a function of restricting the deployment direction of the far-side airbag 20 with the door main body 78A of the airbag door 78 may be realized with a simple structure.

Here, with the vehicle far-side airbag apparatus 60, if, for example, an arm A of a seat occupant P is rested on the armrest 16E as shown by the imaginary lines in FIG. 12A, the far-side airbag 62 deploys in the vehicle front direction while pushing the arm A forward with the lower side duct portion 64. That is, the far-side airbag 62 deploys while pushing away the arm A on the armrest 16E in the vehicle front direction, which is a direction with which a change in attitude of the arm A is simple (may be freed). Therefore, with the vehicle far-side airbag apparatus 60, even when an arm A is rested on the armrest 16E, the far-side airbag 62 may be properly (in a required shape at required positions) deployed between the occupants of the driver seat 12 and the passenger seat 14 in a short duration.

Moreover, with the vehicle far-side airbag apparatus 60, because the engagement protrusion portions 76 of the far-side airbag 62 engage with the center console 16 at the vehicle front end side of the lower side duct portion 64, the far-side airbag 62 has a support structure at two locations at front and rear, and the deployed attitude is stable compared with a cantilever structure. That is, mispositioning in the vehicle lateral direction of the deployed far-side airbag 62 is suppressed, and the required passenger protection effect may be obtained.

In the vehicle far-side airbag apparatus 60, because the far-side airbag 62 has a structure in which the duct portions 64 to 72 are deployed in a ring form and in which the duct portions 64 to 72 are linked by the duct linking portion 74 which is a non-inflating portion, a reduction in volume of the far-side airbag 62 can be achieved. In accordance therewith, a reduction in volume of the inflator 26 and hence an increase in compactness of the airbag module 22 can be achieved. Thus, the airbag module 22 may be easily loaded in the center console 16 with great constraints on loading space.

Further yet, in the vehicle far-side airbag apparatus 60, because the airbag module 22 is provided at the corner portion 16B of the center console 16, stowing capability and volume of the stowing cavity 16A of the center console 16 may be assured. In other words, in the vehicle far-side airbag apparatus 60, with the structure in which the airbag module 22 is disposed at the corner portion 16B, which is effective in terms of stowing capability and usability of the center console 16, the far-side airbag 62 may be properly deployed as described above. Moreover, in the vehicle far-side airbag apparatus 60, because the far-side airbag 62 is constituted in a substantial ring shape as a whole, the far-side airbag 62 in the deployed condition assures a required rigidity (shape maintenance characteristic), and with the structure that contributes to an increase in compactness as mentioned above, may assure required passenger protection (impact absorption) capability.

In the vehicle far-side airbag apparatus 10, because the upward duct portion 72 is included, the lower side duct portion 64 is deployed while gas is allowed to flow into the upward duct portion 72. Therefore, an excessive rise in the internal pressure of the far-side airbag 62 in the deployed state of the far-side airbag 62 is effectively suppressed or prevented, and excellent impact absorption capability by the far-side airbag 62 may be obtained.

-Variant Examples of Far-Side Airbag-

Next, variant examples of the far-side airbag that structures the vehicle far-side airbag apparatus 60 relating to the second exemplary embodiment will be described. Components and portions that are basically the same as structures of the above-described second exemplary embodiment are assigned the same reference numerals as the structures of the above-described first exemplary embodiment and will not be described.

-First Variant Example-

FIG. 13A shows a deployment complete state of a far-side airbag 80 relating to a first variant example in a schematic side view. As shown in this drawing, the far-side airbag 80 includes an upward duct portion 82 instead of the upward duct portion 72. In contrast to the upward duct portion 72 deploying at the initial period of deployment of the far-side airbag 62, the upward duct portion 82 deploys later than the other duct portions 64 to 70.

Specifically, as shown in FIG. 13A and FIG. 13B, a tear seam 84 is provided at a boundary portion between the lower side duct portion 64 and the upward duct portion 82, which is a sewn portion that is torn when the internal pressure of the far-side airbag 80 (the other duct portions 64 to 70) is at or above a predetermined value. In the far-side airbag 80, the lower side duct portion 64, front side duct portion 66, upper side duct portion 68 and rear side duct portion 70 receiving a gas supply from the inflator 26 deploy, and when the internal pressure is at or above the predetermined value, the tear seam 84 is torn and the upward duct portion 82 is deployed.

With the vehicle far-side airbag apparatus 60 that is provided with the far-side airbag 80 relating to this first variant example too, basically the same effects may be obtained by the same operations as with the vehicle far-side airbag apparatus 60 that is provided with the far-side airbag 62. Further, because the duct portions 64 to 70 deploy before the upward duct portion 82 is deployed, a region of the far-side airbag 80 corresponding to head areas of the seat occupants P of the driver seat 12 and the passenger seat 14 is deployed in a short duration. Thereafter, the tear seam 84 is torn when the internal pressure of the far-side airbag 80 is at or above the predetermined value and the upward duct portion 82 deploys, and an excessive rise in the internal pressure of the far-side airbag 80 is effectively suppressed or prevented.

-Second Variant Example-

Figure 14:
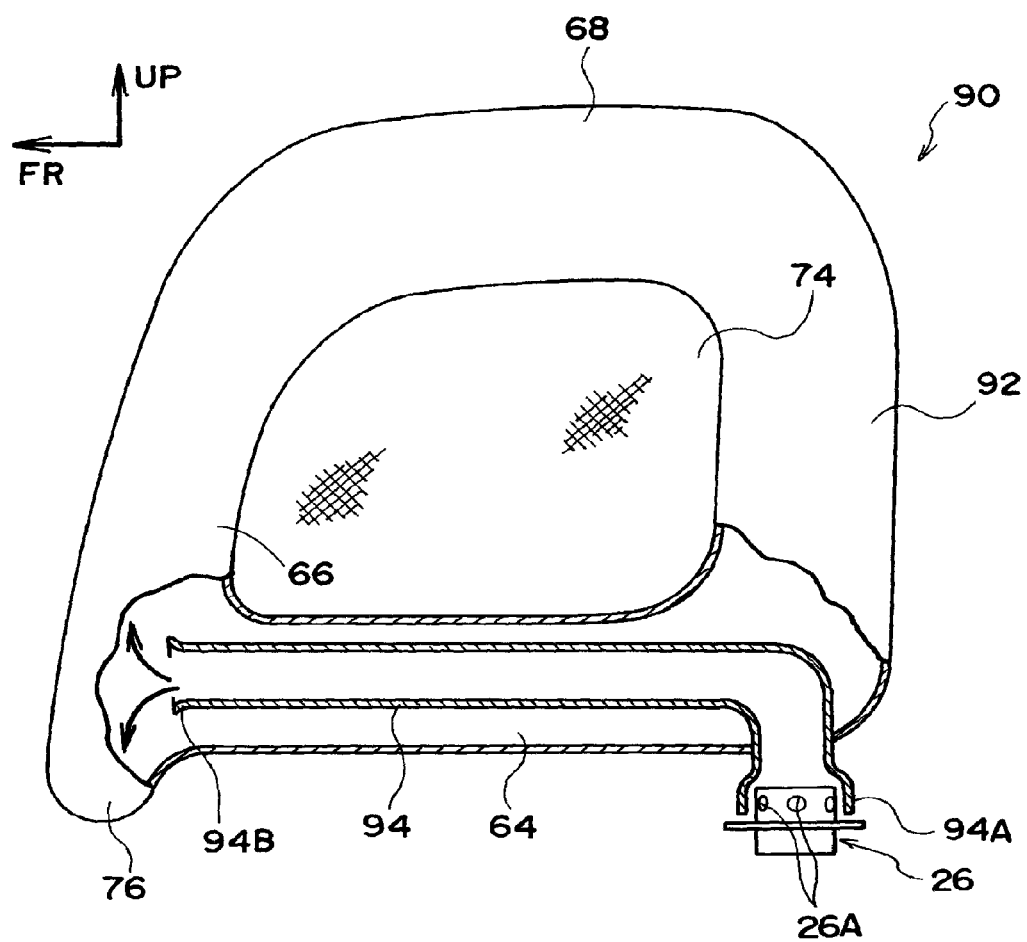
FIG. 14 is a side view showing a deployment complete state of a second variant example of the airbag constituting the vehicle far-side airbag apparatus relating to the second exemplary embodiment of the present invention.

FIG. 14 shows a deployment complete state of a far-side airbag 90 relating to a second variant example in a schematic side view. As shown in this drawing, the far-side airbag 90 includes a rear side duct portion 92 that communicates between the vehicle rear ends of the lower side duct portion 64 and the upper side duct portion 68, instead of the structure in which the rear side duct portion 70 and the upward duct portion 72 are directly non-communicating. That is, the far-side airbag 90 is formed in a continuous ring form in which the lower side duct portion 64, the front side duct portion 66, the upper side duct portion 68 and the rear side duct portion 92 are communicated.

Further, the far-side airbag 90 is provided with an inner duct 94. Of the inner duct 94, one end 94A is fitted to the gas outflow port 26A of the inflator 26, and an other end 94B is inserted into the lower side duct portion 64 and opened at a vehicle front end of the lower side duct portion 64. Thus, in the far-side airbag 90, when the inflator 26 produces gas, firstly the lower side duct portion 64 is deployed together with the inner duct 94, and then the front side duct portion 66, the upper side duct portion 68 and the rear side duct portion 92 are successively deployed.

With the vehicle far-side airbag apparatus 60 that is provided with the far-side airbag 90 relating to this second variant example too, basically the same effects may be obtained by the same operations as with the vehicle far-side airbag apparatus 60 that is provided with the far-side airbag 62.

-Third Variant Example-

Figure 15:
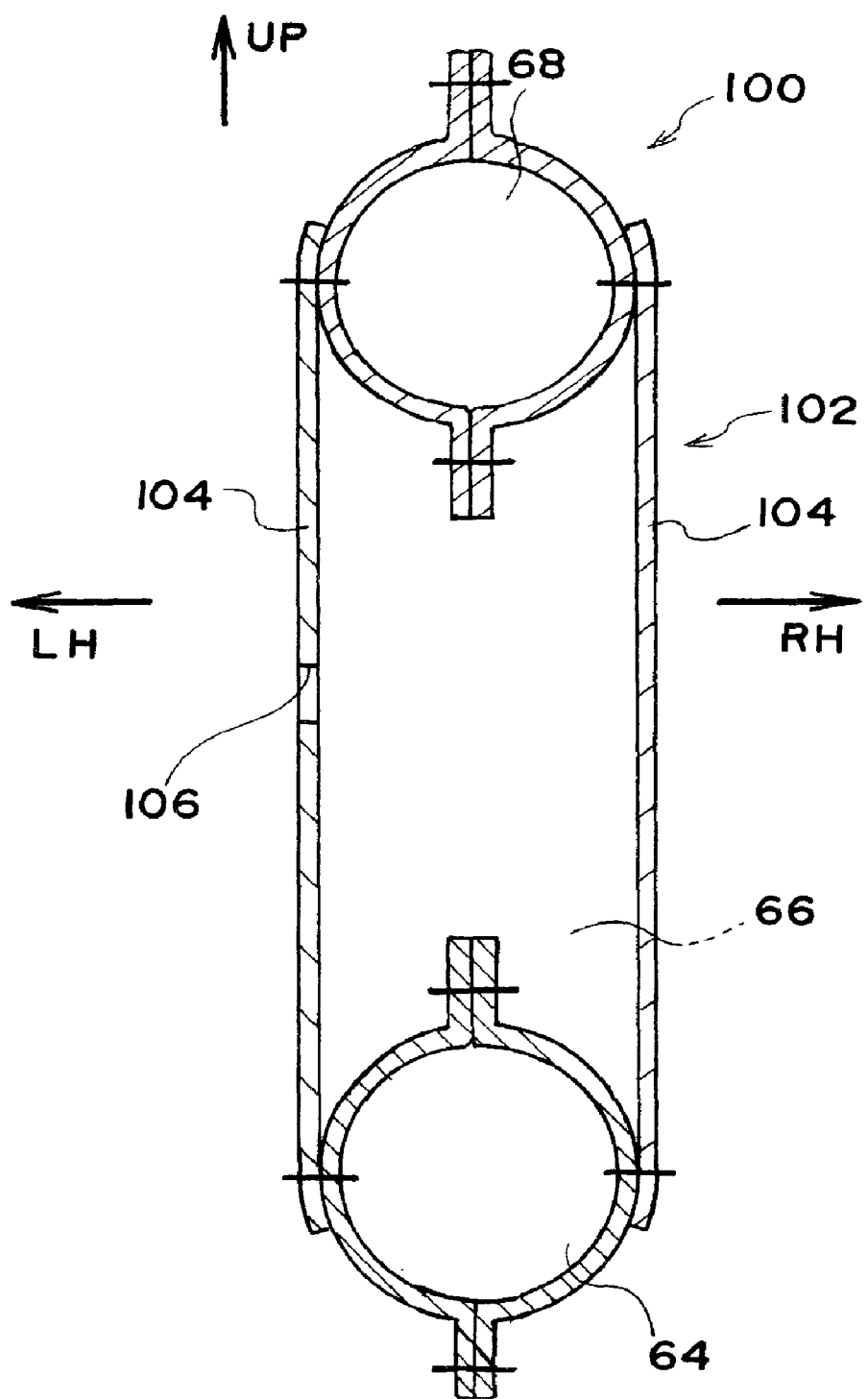
FIG. 15 is a sectional view showing a deployment complete state of a third variant example of the airbag constituting the vehicle far-side airbag apparatus relating to the second exemplary embodiment of the present invention.

FIG. 15 shows a deployment complete state of a far-side airbag 100 relating to a third variant example in a schematic sectional view. As shown in this drawing, the far-side airbag 100 includes a duct linking portion 102, which is formed of a pair of fabric members 104, instead of the single membrane-form duct linking portion 74.

The duct linking portion 102 is structured by the fabric members 104 being joined by sewing or the like to side faces different from the vehicle lateral direction of the duct portions 64 to 72. Thus, in a deployed state of the far-side airbag 100, a cavity is structured at the interior of the duct linking portion 102. A vent hole 106 is formed in at least one of the fabric members 104, such that formation of this cavity (air inflow) does not cause resistance in inflation and deployment of the far-side airbag 100.

With the vehicle far-side airbag apparatus 60 that is provided with the far-side airbag 100 relating to this third variant example too, basically the same effects may be obtained by the same operations as with the vehicle far-side airbag apparatus 60 that is provided with the far-side airbag 62.

In the second exemplary embodiment described above, examples are illustrated in which the far-side airbag 20 includes the rear side duct portion 70 and the upward duct portion 72 or the upward duct portion 82, or the rear side duct portion 92, but the present invention is not to be limited thus. For example, the far-side airbag 62 or the like may be given a structure that is constituted by the lower side duct portion 64, the front side duct portion 66, the upper side duct portion 68 and the duct linking portion 74. Further, with a structure that does not include the rear side duct portion 70, a structure is possible in which the upward duct portion 82 deploys up to the vehicle rear end of the upper side duct portion 68 (or a vicinity thereof).

In the second exemplary embodiment described above, an example has been illustrated in which the far-side airbag 20 includes the engagement protrusion portions 76 that engage so as to sandwich the center console 16, but the present invention is not to be limited thus. For example, a structure is possible that includes an engaging protrusion portion that fits into a recessed portion that is provided in the center console 16 and opens upward, and as a further example, a structure is possible that does not include a region corresponding to the engaging portion of the present invention.

Further, in the exemplary embodiments, examples are illustrated in which the airbag door 40 or 78 supports reaction force of the far-side airbag 20 or the far-side airbag 62 (80, 90, 100), but the present invention is not to be limited thus. For example, in a structure in which an airbag door is provided in the upper face of the center console 16, a rear wall of the accommodation portion of the airbag module 22 in the center console 16 may serve as a reaction force support surface, and an airbag door provided in the upper face of the center console 16 may serve as a reaction force support surface.

Further, in the exemplary embodiments described above, examples have been illustrated that include the stoppers 48 that engage with the inner face of the upper wall 16D of the center console 16, but the present invention is not to be limited thus. For example, a structure is possible in which, as the door attitude retaining structure, a protrusion portion that retains the airbag door 40 in the opened attitude is provided between a rear face of the airbag door 40 and a wall face of the rear face of the center console 16 below the airbag door 40.

Further yet, in the exemplary embodiments described above, examples have been illustrated in which the vehicle far-side airbag apparatus 10 or 60 is employed between the driver seat 12 and the passenger seat 14, but the present invention is not to be limited thus. For example, the present invention may be employed in seats of a second row (rear seats) in which a center console is provided between seats arranged to left and right, or seats of a third row or the like.

The invention claimed is:

1. A vehicle between-seat airbag apparatus comprising:
an airbag that is stowed in a corner portion at a vehicle rear end side and upper end side of a center console that is disposed between seats arranged in a vehicle lateral direction, the airbag receiving a gas supply and being inflated; and
a bag deployment direction-restricting structure that causes the airbag that receives the gas supply and is inflated to deploy in a vehicle front direction and upward with respect to the corner portion, the bag deployment direction-restricting structure being structured to include:
an airbag door that is provided at the center console and, by deployment pressure of the airbag, opens an aperture for the airbag to deploy out of the center console,
a reaction force support portion that is provided at the airbag door;
a door attitude retaining structure for retaining an attitude when the airbag door is opening the aperture in a predetermined opened attitude in which the reaction force supporting portion is capable of supporting the airbag from a vehicle rear direction; and a deployment shape of the airbag itself that receives the gas supply and is deployed upward and in the vehicle rear direction after being deployed to the vehicle front direction, and the airbag including:

a lower side duct portion that is deployed to the vehicle front direction along a lower edge of the airbag;

a front side duct portion that is deployed to upward from a vehicle front end portion of the lower side duct portion;

an upper side duct portion that is deployed toward the vehicle rear direction from an upper end portion of the front side duct portion; and a duct linking portion that restricts relative positions of the lower side duct portion, the front side duct portion and the upper side duct portion by tension in a deployment complete state of the duct portions, and being structured so as to be deployed in the order of the lower side duct portion, the front side duct portion and the upper side duct portion.

2. The vehicle between-seat airbag apparatus according to claim 1, wherein the airbag further comprises a rear side duct portion that is deployed downward from the vehicle rear end side of the upper side duct portion and of which a vehicle front end side is linked to the duct linking portion, and is structured so as to be deployed in the order of the lower side duct portion, the front side duct portion, the upper side duct portion and the rear side duct portion.

3. The vehicle between-seat airbag apparatus according to claim 2, wherein the duct linking portion of the airbag is structured such that a pair of fabric members at different faces in the vehicle lateral direction of the lower side duct portion, the front side duct portion, the upper side duct portion and the rear side duct portion are joined and a cavity is formed thereinside in the deployed state of the airbag, and a vent hole is formed in at least one of the fabric members.

4. The vehicle between-seat airbag apparatus according to claim 2, wherein the airbag is structured with the lower side duct portion, the front side duct portion, the upper side duct portion and the rear side duct portion being communicated and forming a continuous ring shape, and an inner duct being further provided, which is provided inside the lower side duct portion, a vehicle rear side end portion of which is fitted to a gas outflow port, and which is opened at a vehicle front side portion of the lower side duct portion.

5. The vehicle between-seat airbag apparatus according to claim 1, wherein the airbag is formed such that a lower side airbag is deployed toward the vehicle front direction along an upper face of the center console by gas being supplied through a vehicle rear portion of the lower side airbag.

6. The vehicle between-seat airbag apparatus according to claim 1, wherein the duct linking portion of the airbag is a non-inflating portion that is formed in a membrane form or a narrow width portion that is deployed more narrowly in the vehicle lateral direction than the lower side duct portion, the front side duct portion and the upper side duct portion.

7. The vehicle between-seat airbag apparatus according to claim 2, wherein the airbag further comprises an upward duct portion that is deployed upward from the vehicle rear end side of the lower side duct portion and of which a vehicle front end side is linked to the duct linking portion.

8. The vehicle between-seat airbag apparatus according to claim 7, wherein a tear seam, which is sewn so as to be torn when an internal pressure of the airbag is at or above a predetermined value, is provided at a boundary portion between the lower side duct portion and the upward duct portion of the airbag.

9. The vehicle between-seat airbag apparatus according to claim 1, wherein the airbag further comprises an engaging portion that is protruded downward from the vehicle front end side of the lower side duct portion and engages with the center console.

10. The vehicle between-seat airbag apparatus according to claim 1, wherein an inflator, which generates gas that is supplied to the airbag, is fixed to the vehicle body via a bracket so as to be separated from the vehicle body in a vehicle vertical direction.

11. The vehicle between-seat airbag apparatus according to claim 1, wherein the bag deployment direction-restricting structure is structured to further include a pair of left and right side walls that are provided at the airbag door and restrict deployment of the airbag in the vehicle lateral direction.

12. The vehicle between-seat airbag apparatus according to claim 11, wherein the door attitude retaining structure is provided at the airbag door and is structured to include a pair of stoppers that, when the airbag door reaches the predetermined attitude, engage with a ceiling of the center console and retain the attitude of the airbag door at the predetermined attitude, and the pair of side walls are formed integrally with the pair of stoppers.

13. The vehicle between-seat airbag apparatus according to claim 1, wherein the airbag door is structured such that the aperture opens by a substantially letter U-shaped tear portion, which is formed in a rear face side of the center console and opens to downward, being torn and being turned to the vehicle rearward side with a lower end side serving as a hinge.

14. The vehicle between-seat airbag apparatus according to claim 13, wherein the bag deployment direction-restricting structure is structured to further include a pair of left and right side walls that are provided at the airbag door and restrict deployment of the airbag in the vehicle lateral direction, and a pair of vertical tear lines of the letter U-shaped tear portion, which are formed in parallel with one another, are formed at vehicle lateral direction outer sides relative to the pair of side walls.

* * * * *